United States Patent [19]
Moriya et al.

[11] Patent Number: 5,832,363
[45] Date of Patent: Nov. 3, 1998

[54] MOBILE COMMUNICATION SYSTEM INCLUDING SERVICE MANAGEMENT OF TRAFFIC MACHINES

[75] Inventors: Osamu Moriya, Kawasaki; Takafumi Sakamoto, Yokohama; Mutsumu Serizawa, Tokyo-to, all of Japan

[73] Assignee: Kabushiki Kaisha Toshiba, Kawasaki, Japan

[21] Appl. No.: 493,117

[22] Filed: Jun. 20, 1995

[30] Foreign Application Priority Data

| Jun. 20, 1994 | [JP] | Japan | 6-137615 |
| Dec. 27, 1994 | [JP] | Japan | 6-324151 |

[51] Int. Cl.$^6$ ................................. H04B 7/26
[52] U.S. Cl. ............... 455/11.1; 455/422; 455/436; 455/456; 455/524; 187/391
[58] Field of Search ................ 455/11.1, 33.1, 455/33.2, 34.1, 55.1, 56.1, 431, 41, 465, 456, 66, 517; 379/58, 59, 60; 187/391

[56] References Cited

U.S. PATENT DOCUMENTS

| 4,209,749 | 6/1980 | Becker et al. | 455/56.1 |
| 5,282,239 | 1/1994 | Yokoi et al. | 455/465 |
| 5,349,631 | 9/1994 | Lee | 379/59 |
| 5,504,809 | 4/1996 | Chalmers et al. | 379/167 |
| 5,519,761 | 5/1996 | Gilhousen | 455/11.1 |
| 5,548,835 | 8/1996 | Sasaki | 455/277.1 |

FOREIGN PATENT DOCUMENTS

| 55-41032 | 3/1980 | Japan . |
| 63-300084 | 12/1988 | Japan . |
| 5-22199 | 1/1993 | Japan . |
| 6219655 | 8/1994 | Japan . |

*Primary Examiner*—Wellington Chin
*Assistant Examiner*—Lee Nguyen
*Attorney, Agent, or Firm*—Foley & Lardner

[57] ABSTRACT

A mobile communication system including operation management of traffic machines, includes mobile radio terminals for receiving predetermined communication data, and which can be carried by a user of mobile communication; at least one traffic machine for transporting the user having the terminals; an operation management element for managing operation of the traffic machine by operation management data which are generated from predetermined operation data; and a line management element for managing radio lines used by the terminals on the basis of any one of position data and position change data of the terminals.

4 Claims, 37 Drawing Sheets

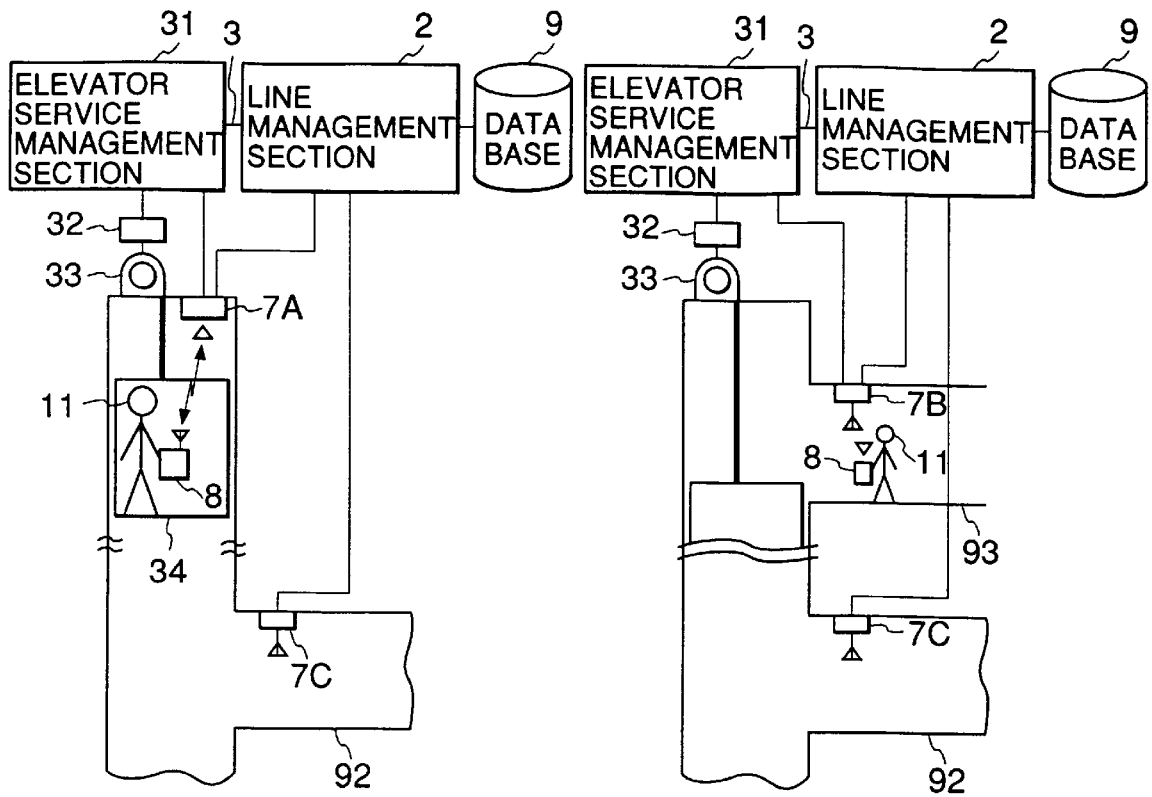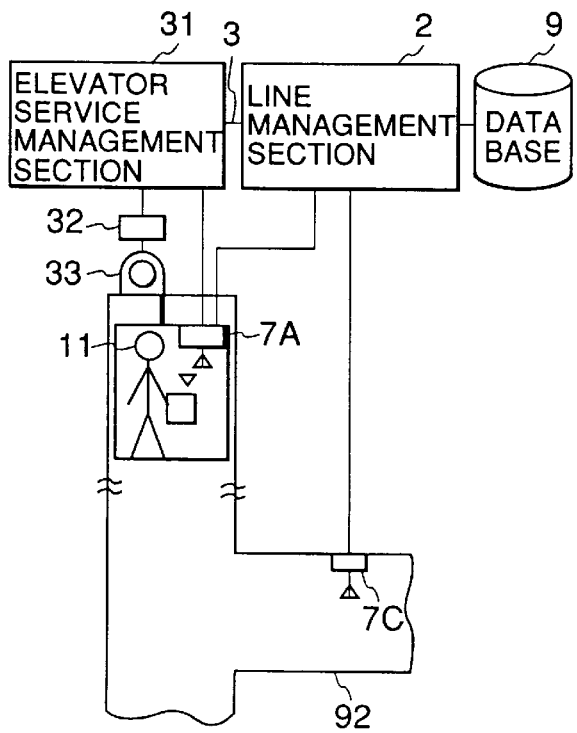
FIG.12A FIG.12B FIG.12C

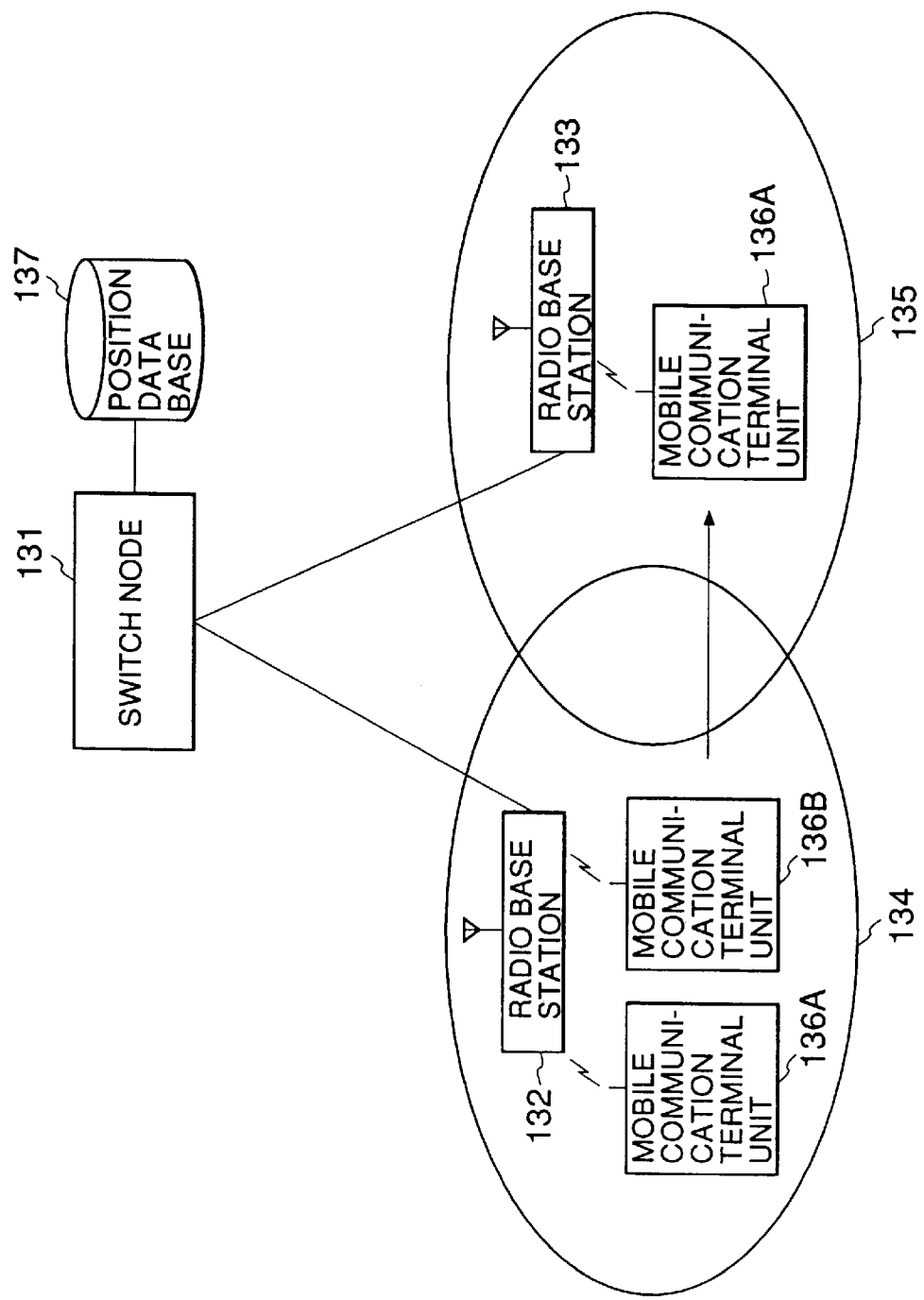

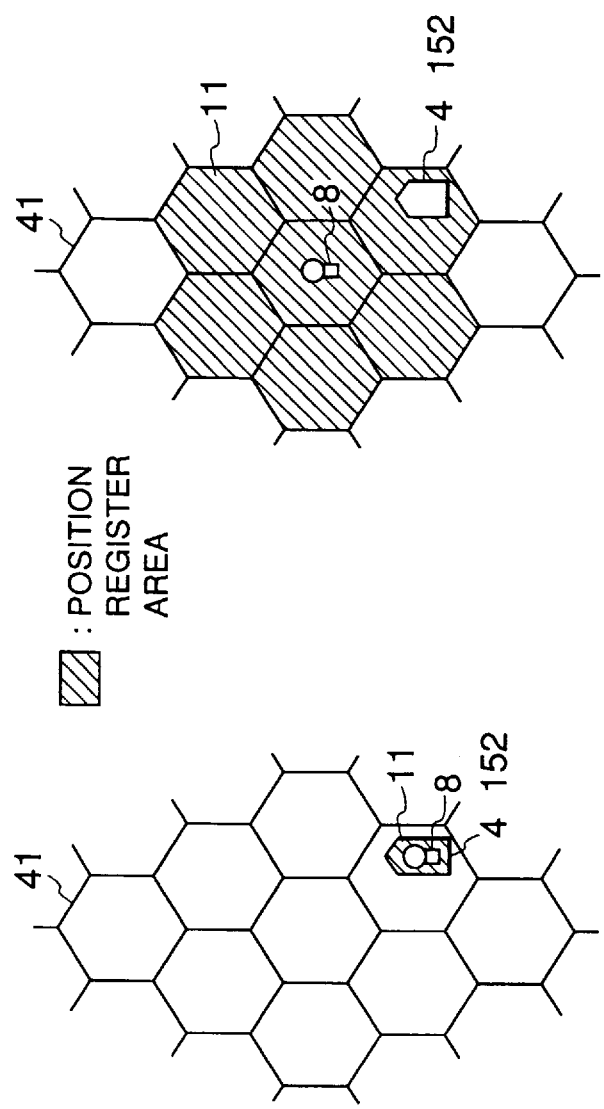

: POSITION REGISTER AREA
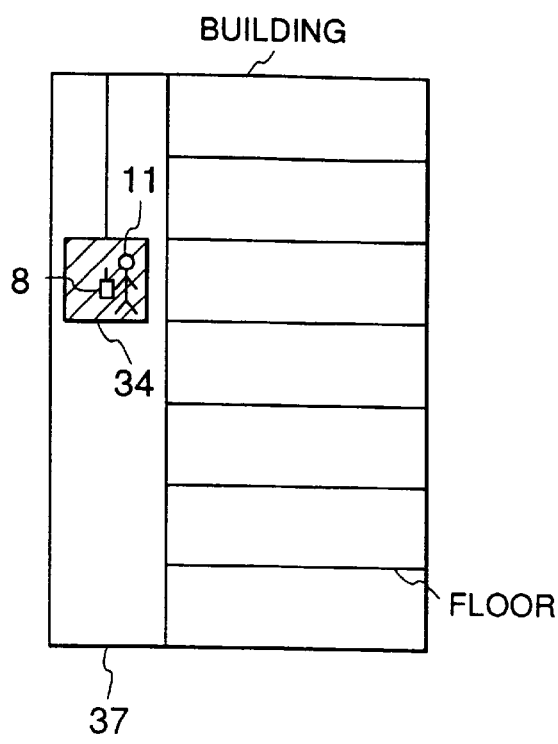
FIG.19A
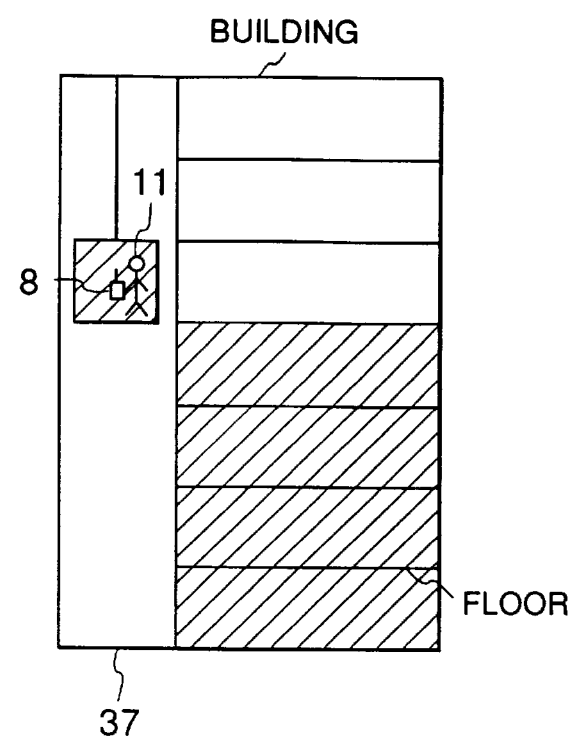
FIG.19B

MOBILE COMMUNICATION SYSTEM INCLUDING SERVICE MANAGEMENT OF TRAFFIC MACHINES

BACKGROUND OF THE INVENTION

The present invention relates to a mobile communication system including service management of traffic machines, more specifically to the mobile Communication system including a function of the service management of internal and external traffic machines such as trains, busses and elevators, in addition to a function of communication management for establishing communication lines between radio base stations for respectively forming radio zones within a predetermined service area and a plurality of radio terminals moving in the service area. The specification uses a term of "traffic machine" as a generic concept of external transport facilities and internal carry machines, in which the external transport facilities are managed to be periodically running according to a predetermined diagram, and the internal carry machines upwardly and downwardly carry persons and products in buildings and are managed by groups in the manner that a plurality of such as elevators are not concentrated at the same floor.

FIG. 1A shows an example of prior art traffic machine control system, and FIG. 1B shows an example of prior art mobile communication system composed. In FIG. 1A, the service management section 1 manages the services of a plurality of traffic machines 4. Further, each traffic machine 4 is composed of an operation control section 5 for controlling the traffic machine 4 and a drive section 6 driven by the operation control section 5. On the other hand, in FIG. 1B, the line management section 2 is connected to a radio base station 7 for connecting radio lines to radio terminal units 8. In the above-mentioned prior art service management system and the mobile communication system, however, since a data transmission path is not interposed between the service management section 1 and the line management section 2, there exists a problem in that the traffic machines and the mobile communication system are both operated independently from each other during service; in other words, the service management section 1 controls only the traffic machines on the basis of only data related to traffic machine service, and the line management section 2 controls only the mobile communication system on the basis of only the status of the mobile communication system.

Further, FIG. 2 shows another example of prior art intra-building mobile communication system. In FIG. 2, the system is composed of a line management section 2 for the mobile communication system, a plurality of radio base stations 7A to 7C provided for each landing floor of a traffic machine (e.g., elevator), a plurality of radio zones 10A to 10C formed by the radio base stations 7A to 7C respectively, an elevator hoist-way 37, some landing floors 12, and a data base 9 for storing positions of the users of the mobile communication system. In the above-mentioned prior art mobile communication system, however, since the radio zones are constructed in unit of floor, whenever the mobile communication user moves from a floor to another floor, the radio lines are reconnected between the radio base stations at each landing floor. In addition, the mobile terminal units 8 or the positions of the mobile communication users 13 are registered in the data base 9 in unit of landing floor. In other words, the mobile terminal units 8 and the mobile communication users 13 are not registered within the elevator.

On the other hand, recently, in order to cope with an increase in the number of subscribers of the mobile communication system such as automatic telephones, mobile telephones, etc., such a method has been adopted that a plurality of base stations are provided in a service area and the same frequency is used between the shortest base stations (because the same frequency can be used repeatedly). In this mobile communication system, it is possible to effectively use the radio frequency band by reducing the radio zone formed by a single base station, so that a larger number of subscribers can be accommodated.

A position register method and a call method of the mobile communication system as described above will be explained with reference to FIG. 23A. In FIG. 23A, when a mobile body position is registered for each radio zone 1101, the traffic (capacity) of the position registers becomes huge in accompany with the movement between the radio zones 1101 of the mobile body. To overcome this problem, such a position register method and such a call method have been adopted that: a plurality of radio zones are collected as a single position register area 1010 to such an extent that the traffic of calling the mobile bodies will not increase much; and whenever the mobile body is called, the mobile body is called in all the radio zones 1101 in the position registered area 1010. In this method, the mobile body is registered in a new position register area, whenever it goes out of the position register area now registered.

In this prior art mobile communication system as described above with reference to FIGS. 1A and 1B and FIG. 2, however, since the mobile communication system is controlled quite independently from the traffic machines, a new radio line allocation for communication with the mobile communication terminal unit 8 by the radio base station 7 is effected whenever the mobile terminal unit enters the radio zone of the base station. Therefore, when the number of the radio lines is not sufficient for the new radio line allocation, speech or conversation must be cut off forcibly even during telephone communication, thus raising a problem in that the communication service deteriorates markedly.

In addition, in the radio zone construction of the prior art mobile communication system as explained with reference to FIGS. 1A, 1B and 2, since the radio zone is provided for each floor, when the mobile communication terminal unit is carried in a traffic machine moving in the vertical direction at a relatively high speed as with the case of an elevator, since the radio zones are crossed at a high speed at each landing floor, a control signal is generated due to the line hand-off (switching of radio zones) during speech whenever the radio zones are switched, so that the controlled variables increase out of control.

Further, in the prior art position register method and call method as explained with reference to FIG. 23A, when a great number of mobile bodies are accommodated and further a personal mobile communication system is taken into account, there exists a problem in that the traffic (capacity) increases greatly for the position registers and calls.

In particular, when many mobile bodies enter a specific position register area in a short time, since the position registers must be made even if the mobile bodies are not called, the traffic of position registers becomes large. Further, when the mobile body stays at the same register area for a long time and further the same mobile body is often called, the calling traffic also increases.

SUMMARY OF THE INVENTION

With these problems in mind, therefore, it is the object of the present invention to provide a mobile communication system which can control the mobile communication terminal units in linkage with the traffic machines.

Further, another object of the present invention is to transmit the movement prediction data of the mobile communication users obtained by the mobile communication line management section to the service management section of the traffic machines, so that the user's operation of the terminal units can be reduced and thereby the traffic machines can be operated by reducing the waiting time thereof.

Further, another object of the present invention is to reduce all the traffics (capacities) required for position registers and the callings to solve the problems involved in the prior art method.

Further, the other object of the present invention is to control the radio lines on the basis of the prediction of motion of the traffic machines, when the mobile communication users use a traffic machine.

To achieve the above-mentioned object, the present invention provides a mobile communication system, comprising: mobile radio terminal means for receiving at least digital data; and control means for controlling radio lines used by said mobile radio terminal means on the basis of any one of position data and position change data of said mobile radio terminal means.

Further, the present invention provides a mobile communication system, comprising: service managing means for controlling services of traffic machines; line managing means for managing radio lines for mobile communications; and data transmitting means interposed between said service managing means and said line managing means.

Further, the present invention provides a mobile communication system, comprising: service managing means for controlling services of traffic machines; line managing means for managing radio lines for mobile communications; data transmitting means interposed between said service managing means and said line managing means; and radio base station means, wherein when it is predicted that a mobile communication user uses a traffic machine within a short time, prediction data of use of the traffic machine is transmitted from said base station means to said service managing means.

Further, the present invention provides a mobile communication system constructed by a plurality of radio zones for rendering communication services to a plurality of mobile bodies, wherein at least one position non-register area each constructed by at least one radio zone is provided, and position of at least one mobile body coming into the position non-register area is not registered for a time. Further, it is preferable that a mobile body is called in at least one radio zone included in the position register area in which the mobile body is registered and, if fails, in at least one radio zone included in the position non-register area.

Further, the present invention provides a mobile communication system, comprising: service managing means for controlling services of traffic machines, line managing means for managing radio lines for mobile communications; and data transmitting means interposed between said service managing means and said line managing means, and wherein movement of a mobile communication user existing in a traffic machine is predicted on the basis of movement status of the traffic machine, to control mobile communication at a user's destination before the user reaches the destination.

The feature of the first aspect of the mobile communication system according to the present invention can be summarized as follows:

In the basic (first) embodiment (shown in FIG. 3), since data can be transmitted between the service management section and the line management section, it is possible to control both the sections in linkage with each other on the basis of the respective management data.

Further, in the second embodiment (shown in FIG. 4), since the line management section can detect the hand-off (the motion) of the user having the mobile communication terminal unit by use of two radio base stations, when the user approaches a traffic machine, it is possible to automatically call the traffic machine (e.g., elevator) to the landing floor on which the user exists, without transmitting any service request signal to the traffic machine from the user.

Further, in the third embodiment (shown in FIG. 5), since the line management section can detect the direction of the hand-off of the users having the mobile communication terminal units, respectively on the basis of the two radio base stations, it is possible to discriminate whether the users now get on or off the elevator.

Further, in the fourth embodiment (shown in FIGS. 6 and 7), since the radio base stations can detect the congestion of the radio lines, respectively, it is possible to command the traffic machine so as not to pass through a congested radio zone for prevention of the radio line interruption so that user's speech is cut off.

Further, in the fifth embodiment (shown in FIG. 8), the traffic machine can be moved by the drive control section, the drive section and the movement section all install out of the traffic machine. Even in this embodiment, the same effect as with the case of the other embodiments can be obtained.

Further, in the sixth embodiment (shown in FIG. 9), the radio base stations are installed in the traffic machine and the ground respectively. Therefore, when the user exists in the traffic machine and therefore in one radio zone, since the movement route of the user can be previously known, the radio line can be previously handed off (switched) to the other radio zone on the basis of the predicted route of the user.

Further, in the seventh embodiment (shown in FIG. 10), the radio management section and the data transmission line are provided for each radio base station, for executing more fine and precise previous control of the hand-off operation of the mobile communication terminal units of the users.

Further, in the eighth embodiment (shown in FIG. 11), when the user having the mobile communication terminal unit registers his destination landing floor of the elevator, the radio line at the destination landing floor is previously allocated before the radio zone is handed off at the destination landing floor.

Further, in the ninth embodiment (shown in FIG. 11), when the radio line cannot be allocated due to congestion in the eighth embodiment, the numbers of the terminal unit and the destination landing floor are both stored to automatically hand-off the radio zone after the congestion ends.

In the tenth embodiment (shown in FIG. 12A), when the user having the mobile communication terminal unit registers his destination landing floor of the elevator and further when the user continues to speak, the radio line at the destination landing floor is previously reserved before the user reaches the landing floor and further the intra-cage radio zone is handed off to the reserved radio zone at the destination landing floor. In addition, when the terminal unit is not used (no conversation), the position date is updated in the position register data base as being in the cage and on the destination landing floor.

In the eleventh embodiment (shown in FIG. 12B), the similar operation as with the case of the tenth embodiment can be obtained at the landing floor before the user gets on the elevator by use of the radio base station installed at the start landing floor.

In the twelfth embodiment (shown in FIG. 12C), the similar operation as with the case of the tenth embodiment can be obtained when the radio base station is installed in the cage (not in the hoist-way).

In the thirteenth embodiment (shown in FIG. 13), the similar operation as with the case of the eighth to tenth embodiments can be obtained, even if the radio base station is provided for both the service management section and the line management section, separately.

Further, in the fourteenth embodiment (shown in FIG. 14), since the radio base station is installed in the elevator hoist-way, when the user having the mobile communication terminal unit is moved in the vertical direction at a high speed, since the radio zone is not handed-off, it is possible to prevent the control signals from being increased due to hand-off and further to eliminate a long communication cable lying in the hoist-way.

Further, in the fifteenth embodiment (shown in FIG. 15 and FIG. 16A), whenever the position data in the position data base is switched from one area to the other area due to the movement of the mobile communication terminal unit, the area is updated a random time after the received field strength has dropped below a predetermined value (slightly higher than that at hand off) at the new area, so that it is possible to scatter the positions at which the position data are updated.

In the sixteenth embodiment (shown in FIG. 15 and FIG. 16B), the similar effect as with the case of the fifteenth embodiment can be obtained when the positions (at which the position data are updated) are scattered within the same position register area.

Further, in the seventeenth embodiment (shown in FIG. 17 and FIGS. 18A and 18B), when the user having the mobile communication terminal unit is on the ground, the user is registered as being in the ground area in the position data bass. However, when the user having the mobile communication terminal unit is in the traffic machine, the user is registered as being in the traffic machine area in the position data base.

In the eighteenth embodiment (shown in FIG. 19A), since the user having the mobile communication terminal unit is in the elevator cage, the user is registered as being in the cage in the position data base.

In the nineteenth embodiment (shown in FIG. 19B), although the user having the mobile communication terminal unit is in the elevator cage, the user is registered as being in the cage and further on some landing floors in the position data base.

Further, in the twentieth embodiment (shown in FIG. 20), the system of the fourteenth embodiment can be applied to two elevator cages of two different landing floors.

In the twenty-first embodiment (shown in FIG. 21), when the user having the mobile communication unit designates the destination landing floor in one of the two cages, the position register area is updated in the position data base as being in the cage and on the destination landing floor.

In the twenty-second embodiment (shown in FIG. 21), when the user having the mobile communication unit designates the destination landing floor in the other of the two cages, the position register area is updated in the position data bass as being in the case and on the destination landing floor.

The feature of the second aspect of the mobile communication system according to the present invention will be summarized as follows:

In the basic (first) embodiment (shown in FIG. 22 and FIGS. 23A and 23B), since at least one position register area and at least one position non-register area are provided, it is possible to reduce the traffic of calls and the traffic of position registers.

In the second embodiment (shown in FIG. 22 and FIGS. 23A and 23B), the area to which many mobile bodies enter in a short time is determined as a position non-register area for a short time, so that it is possible to prevent an increase in traffic of position registers.

In the third embodiment (shown in FIG. 24), when the mobile body stays in one position register area for many hours, the call area is narrowed to construct the call area by a smaller number of radio zones, so that it is possible to reduce the traffic of calls.

In the fourth embodiment (shown in FIG. 25), when the mobile body stays in one position register area for many hours, the call area is repeatedly narrowed to construct the call area by a smaller number of radio zones gradually until the call area is reduced down to only a single radio zone, so that it is possible to reduce the traffic of calls markedly.

In the fifth embodiment (shown in FIG. 26), since the mobile body stays in one position register area for many hours and thereby the call area is narrowed, if the mobile body cannot be called in a predetermined constant time, the mobile body is called in at least one other call area other than the already narrowed call area.

In the sixth embodiment (shown in FIGS. 27A and 27B), the call area of the mobile body is set to the radio zone of when the preceding call ends. Therefore, the mobile body can be next called in only the radio zone, as far as the mobile body stays in the same radio zone, so that it is possible to connect an incoming call to the mobile body. When the mobile body moves to another radio zone, the mobile zone is called by the radio zone other than the already determined radio zone within the position register area. Further, it is also possible to widen the call area when the time (during which the narrow call area is kept set) exceeds a predetermined time.

In the seventh embodiment (shown in FIGS. 28A and 28B), the call area of the mobile body is set to a call area including the radio zone of when the preceding call ends but narrower than the position registered area. Therefore, the mobile body can be next called in the narrower call area, as far as the mobile body stays in the same radio zone, so that it is possible to connect an incoming call to the mobile body. When the mobile body moves to another radio zone, the call area of the mobile body is similarly set to another call area including the radio zone of when the preceding call ends but narrower than the position register area. Therefore, the mobile body can be next called in the narrower call area, as far as the mobile body stays in the same radio zone, so that it is possible to connect an incoming call to the mobile body. When the mobile body moves to another area other than the narrow call area, the mobile body can be called in the radio zone other than the narrow call area within the position registered area.

The feature of the third aspect of the mobile communication system according to the present invention can be summarized as follows:

In the basic (first) embodiment (shown in FIG. 29), since train data and mobile communication terminal data can be both transmitted between the service management section and the line management section, it is possible to control both the sections in linkage with each other on the basis of the respective management data.

Further, in the second embodiment (shown in FIG. 30), since data can be transmitted between the service management section and the trains and between the line management section and the mobile communication terminal units via an artificial satellite, respectively in addition to the service management section and the line management section, it is possible to obtain the similar effect in the case of the transcontinental railways.

Further, in the third embodiment (shown in FIG. 31), when the user having the mobile communication terminal unit approaches the platform of the station, since the data can be transmitted to the service management section 1, it is possible to stop the train at the desired platform of the station.

Further, in the fourth embodiment (shown in FIG. 32), when the congestion of the radio zone along the frontward train route is checked, since an additional call of the mobile communication terminal unit is suppressed in the train, it is possible to prevent the communications of the terminal unit in the trains from being interrupted at the congested radio zone along the train route.

Further, in the fifth embodiment (shown in FIG. 33), since the frontward train route can be known, it is possible to previously control the radio lines for the mobile communication terminal unit in the train.

Further, in the sixth embodiment (shown in FIG. 34), when the two trains pass each other, since the new calls are suppressed previously or since the number of the channels is previously increased, it is possible to prevent communications from interruption in the train.

Further, in the seventh embodiment (shown in FIG. 35), when the train approaches the station, since calls are suppressed or the number of channels of the radio base station for the station can be increased, it is possible to prevent the communication interruption.

Further, in the eighth embodiment (shown in FIG. 36), since the number of users having the mobile terminal units on the platform can be checked, it is possible to allow the trains for many waiting passengers to enter the platform with priority.

Further, in the ninth embodiment (shown in FIG. 37), when the express train passes the ordinary train at the station, since the mobile terminal units in the ordinary train waiting at the station are connected with priority, it is possible to prevent the communication interruption in the ordinary train due to the passing of the express train.

As described above, in the mobile communication system according to the present invention, since the service management of traffic machines and the radio line management of the mobile communications can be both controlled for the users through the data transmission path connected between the service management section and the line management section, in cooperation with each other for improvement of the communication services, predicted services can be rendered to the users for both the traffic machines and mobile communications in combination. For instance, the traffic machine can be previously driven to a predetermined position by checking the movement of the user having the mobile communication terminal unit, or the radio line in a radio zone of the base station can be controlled for prevention of communication interruption due to congestion by predicting the movement of the traffic machine on which the user having the mobile communication terminal unit has gotten.

BRIEF DESCRIPTION OF THE DRAWINGS

In the attached drawings:

FIG. 12A is a block diagram showing tenth embodiment of the first aspect of the mobile communication system according to the present invention, FIG, 12B is a block diagram showing eleventh embodiment of the first aspect of the mobile communication system according to the present invention, and FIG. 12C is a block diagram showing twelfth embodiment of the first aspect of the mobile communication system according to the present invention;

FIG. 15 is a block diagram showing a fifteenth embodiment of the first aspect of the mobile communication system according to the present invention;

FIGS. 18A and 18B are illustrations for assistance in explaining the position register areas of the seventeenth embodiment of the first aspect of the mobile communication system according to the present invention;

FIG. 19A is an illustration for assistance in explaining the position register areas of the eighteenth embodiment of the first aspect of the mobile communication system according to the present invention, and FIG. 19B is an illustration for assistance in explaining the position register areas of the nineteenth embodiment of the first aspect of the mobile communication system according to the present invention;

DETAILED DESCRIPTION OF THE EMBODIMENTS

Various embodiment of the mobile communication system according to the present invention will be described in detail hereinbelow with reference to the attached drawings.
[First aspect]

In the first aspect of the mobile communication system according to the present invention, the service management of traffic machines and the line management of mobile communication terminal units are both controlled in cooperation with each other for improvement of the communication services.

(First embodiment)

Figure 1A:
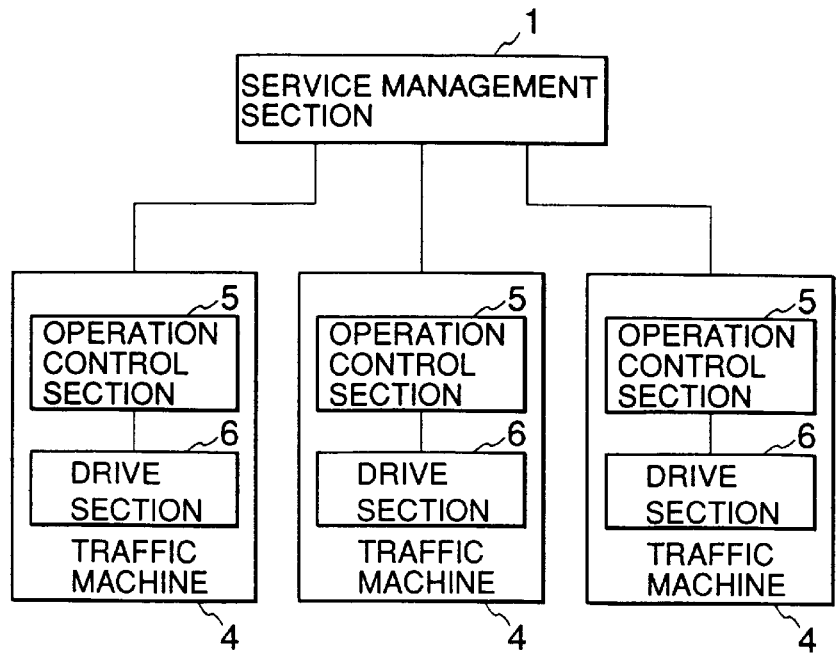
FIG. 1A is a block diagrams showing an example of the prior art traffic machine.
Figure 1B:
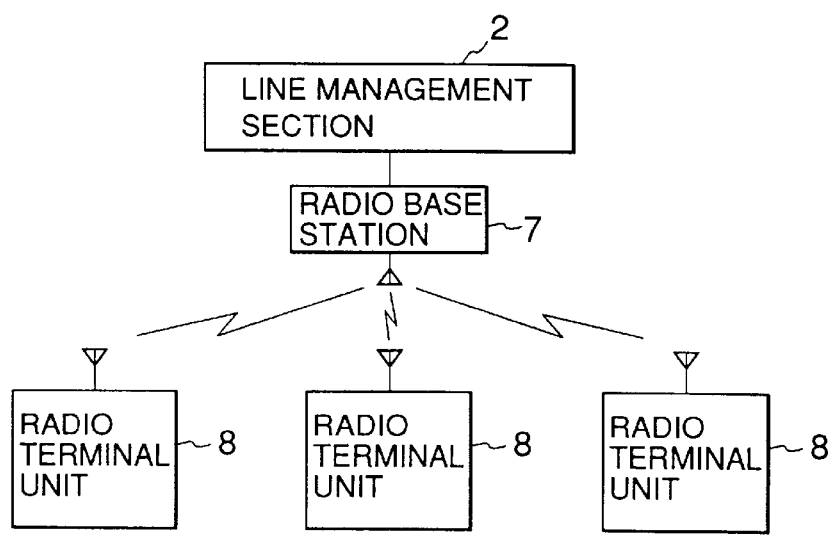
FIG. 1B is a block diagrams showing a prior art mobile communication system.
Figure 2:
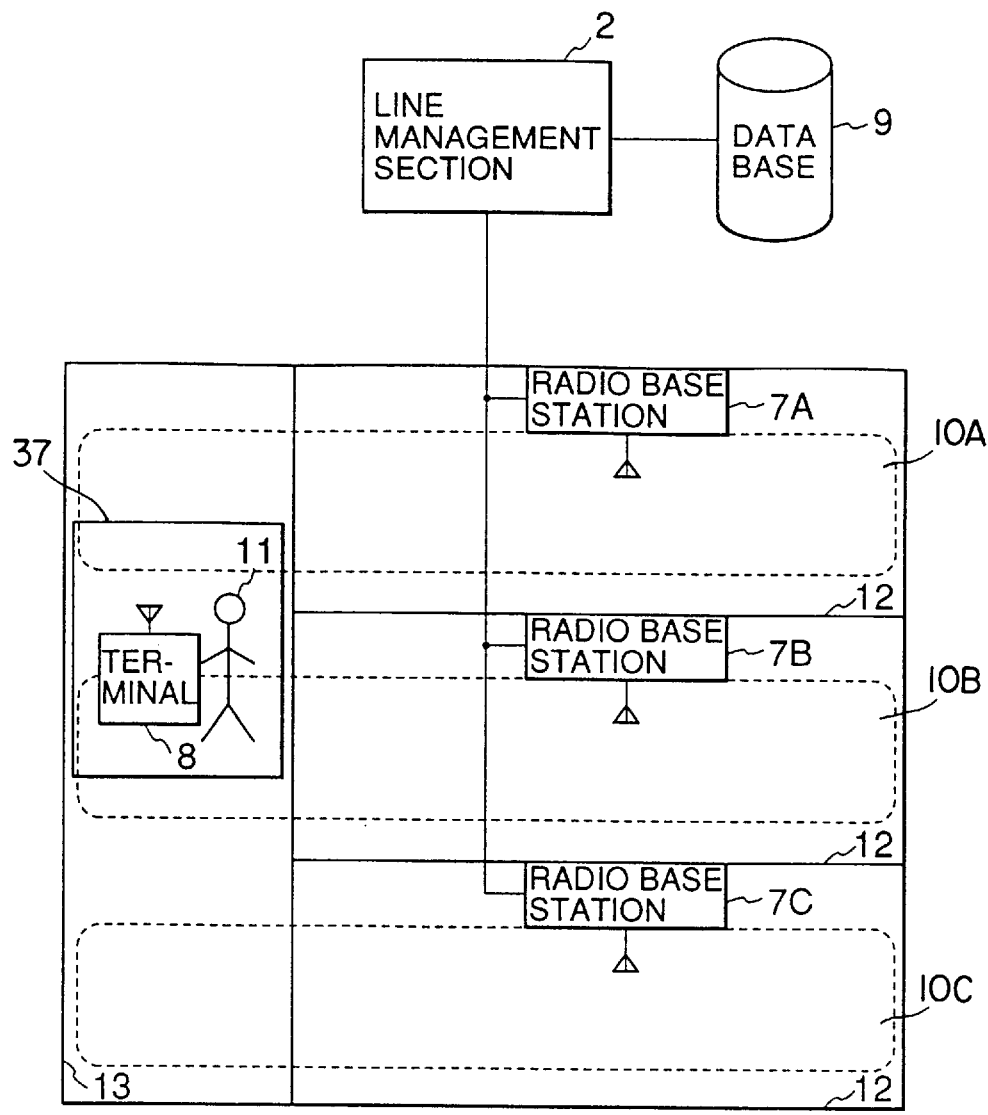
FIG. 2 is a block diagram showing another prior art mobile communication system together with a traffic machine.
Figure 3:
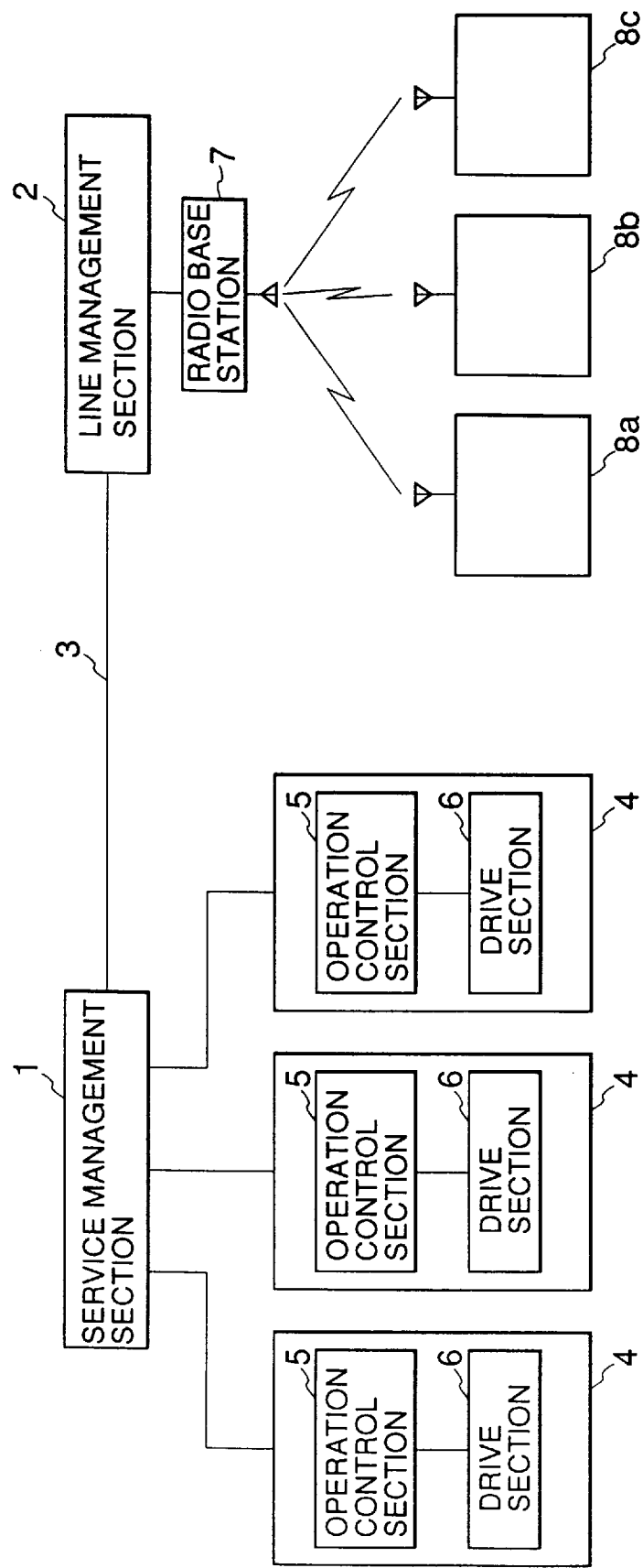
FIG. 3 is a block diagram showing a first embodiment of the first aspect of the mobile communication system according to the present invention.

A first (basic) embodiment of the first aspect of the present invention will be described hereinbelow with reference to FIG. 3. In FIG. 3, the mobile communication system comprises a service management section 1 for controlling traffic machines 4, and a line management section 2 for controlling mobile communication terminal units 8a to 8c. Further, a data transmission path 3 is interposed between the service management section 1 and the line management section 2 to transmit data between the two management sections 1 and 2. A plurality of mobile traffic machines 4 are connected to the service management section 1. A plurality of mobile communication terminal units 8a to 8c are connected to the line management section 2 via a radio base station 7 and radio lines. Further, each traffic machine 4 has an operation control section 5, and a drive section 6 for moving the traffic machine 4. The radio base station 7 is provided with a module/demodulate function for communications between the mobile communication terminal units. A mobile communication terminal unit 8 can communicate with the radio base station 7 via the radio line.

The operation of the mobile communication system as described above will be described hereinbelow. When one of the traffic machine 4 is driven, a control signal is outputted from the operation control section 5 to the drive section 6. The drive section 6 having a power can drive the traffic machine 4. The service management section 1 receives the respective movement status of the traffic machine 4, and outputs an operation command to the operation control section 5 of the traffic machine 4. The base station 7 connected to the line management section 2 manages the radio line between the base station 7 and the radio terminal units 8a to 8c. Between the service management section 1 and the line management section 2, service management data of the traffic machine and the line management data of the radio communication terminal units 8a to 8c are transmitted mutually via the data transmission path 3. Therefore, when there exists a radio terminal unit in the traffic machine 4, it is possible to execute the mutually linked operation between the traffic machine 4 and the radio terminal unit 8a, for instance.

(Second embodiment)

Figure 4:
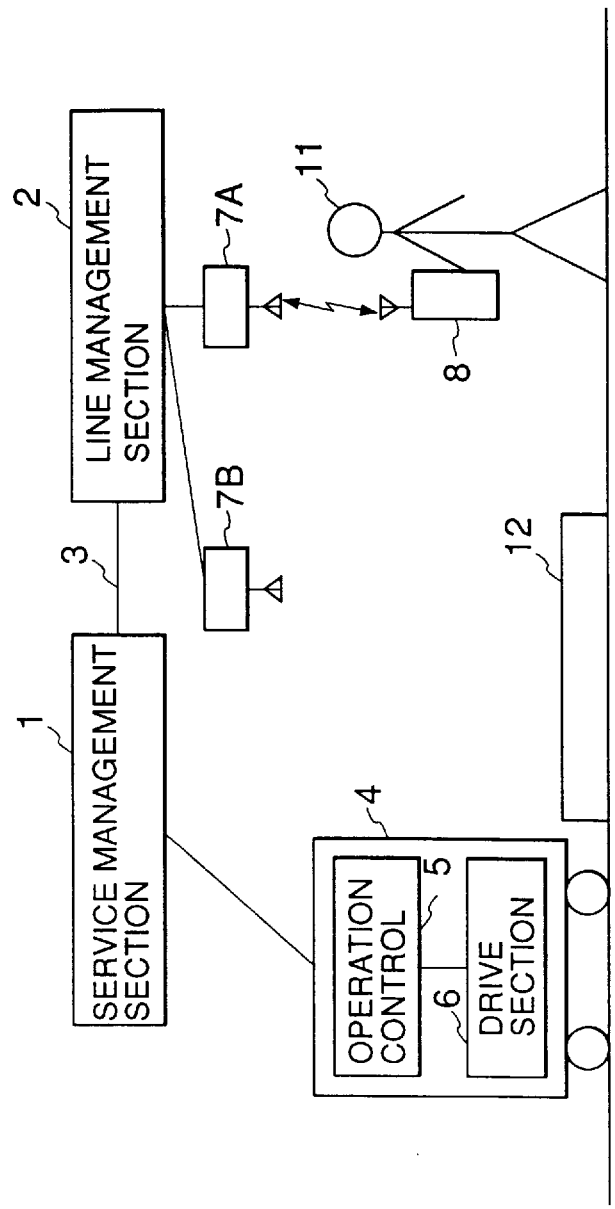
FIG. 4 is a block diagram showing a second embodiment of the first aspect of the mobile communication system according to the present invention.

A second embodiment of the first aspect of the present invention will be described hereinbelow with reference to FIG. 4. In FIG. 4, the mobile communication system comprises a service management section 1 for controlling a traffic machine 4, a line management section 2 for controlling a mobile communication terminal unit 8, a data transmission path 3 for transmitting data between the two management sections 1 and 2. The mobile traffic machine 4 has an operation control section 5 and a drive section 6 having a power for driving the traffic machine 4. The reference numeral 7A denotes a radio base station having a modulate/demodulate function for communications with the radio terminal unit 8, and 7B denotes a radio base station 7B existing at each landing floor of the traffic machine. A radio terminal unit 8 can communicates with the radio base stations 7A and 7B. A mobile communication user 11 is on a platform 12 of the traffic machine 4.

The operation of the mobile communication system will be explained hereinbelow. When the mobile communication user 11 having the mobile communication terminal unit 8 approaches the platform 12 of the traffic machine 4, the mobile communication terminal unit 8 first communicating with the radio base station 7A is handed-off to the radio base station 7B installed at the landing floor. Here, hand-off implies that one radio zone is switched to the other radio zone when the mobile terminal unit moves from one radio zone to the other radio zone during conversation. The line management section 2 transmits the movement of the mobile communication user 11 toward the radio base station 7B to the traffic machine service management section 1 via the data transmission line 3. Therefore, the service management section 1 regards the arrival of the mobile communication user 11 to the landing floor 12 as a request of use of the traffic machine, so that a service command signal is transmitted to the operation control section 5 to move the traffic machine 4 to the landing floor on which the mobile communication user 11 exists, for service. In other words, it is possible for the mobile communication user 11 to accept the service of the traffic machine automatically, without transmitting a request of the use of the traffic machine.

(Third embodiment)

Figure 5:
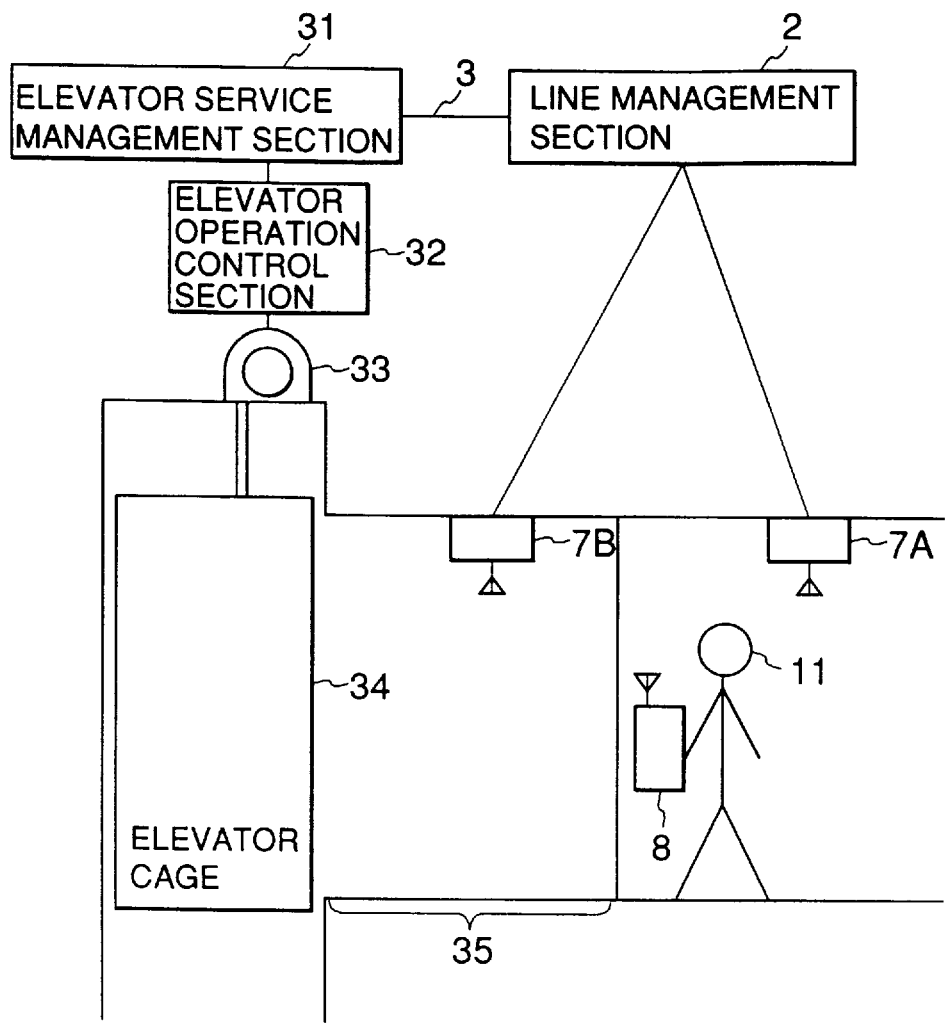
FIG. 5 is a block diagram showing a third embodiment of the first aspect of the mobile communication system according to the present invention.

A third embodiment of the first aspect of the present invention will be explained with reference to FIG. 5. In FIG. 5, an elevator service management section 31 and a line management section 2 of the mobile communications are connected by a data transmission line 3. The line management section 2 is connected to a radio base station 7B for monitoring a mobile communication user 11 on an elevator hall (as a radio zone) and a radio base station 7A installed for each floor(other than the elevator hall). The mobile communication user 11 has a mobile communication terminal unit 8 for communication with the radio base stations 7A and 7B. Further, the elevator can be controlled by an elevator operation control section 32. Further, in FIG. 5, the numeral 33 denotes an elevator hoist (winding) machine, and 34 denotes an elevator cage.

In operation, when the mobile communication user 11 having the mobile communication terminal unit 8 moves on the hall 35, the mobile communication terminal unit 8 is first connected to the radio base station 7A, and after that handed off to the radio base station 7B. Therefore, the line management section 2 transmits a signal indicative of that the mobile communication user 11 moves from the base station 7A to the base station 7B and a signal indicative of the landing floor for the mobile communication user 11 to the elevator service management section 31 via the data transmission path 3. The service management section 31 regards the received data as an elevator cage call, and operates the hoist machine 3 via the operation control section 32 so that the cage 34 can be stopped at the landing floor for the mobile communication user 11. Further, the line management section 2 regards only the mobile communication user 11 moved from the base station 7A to the base station 7B as the elevator cage waiting user, and regards the other users moved from the base station 7B to the base station 7A as the user getting off from the elevator cage. Accordingly, it is possible to transmit only the cage waiting user 11 to the service management section 31, while discriminating the cage waiting user from the other users who have gotten off from the elevator cage.

(Fourth embodiment)

Figure 6:
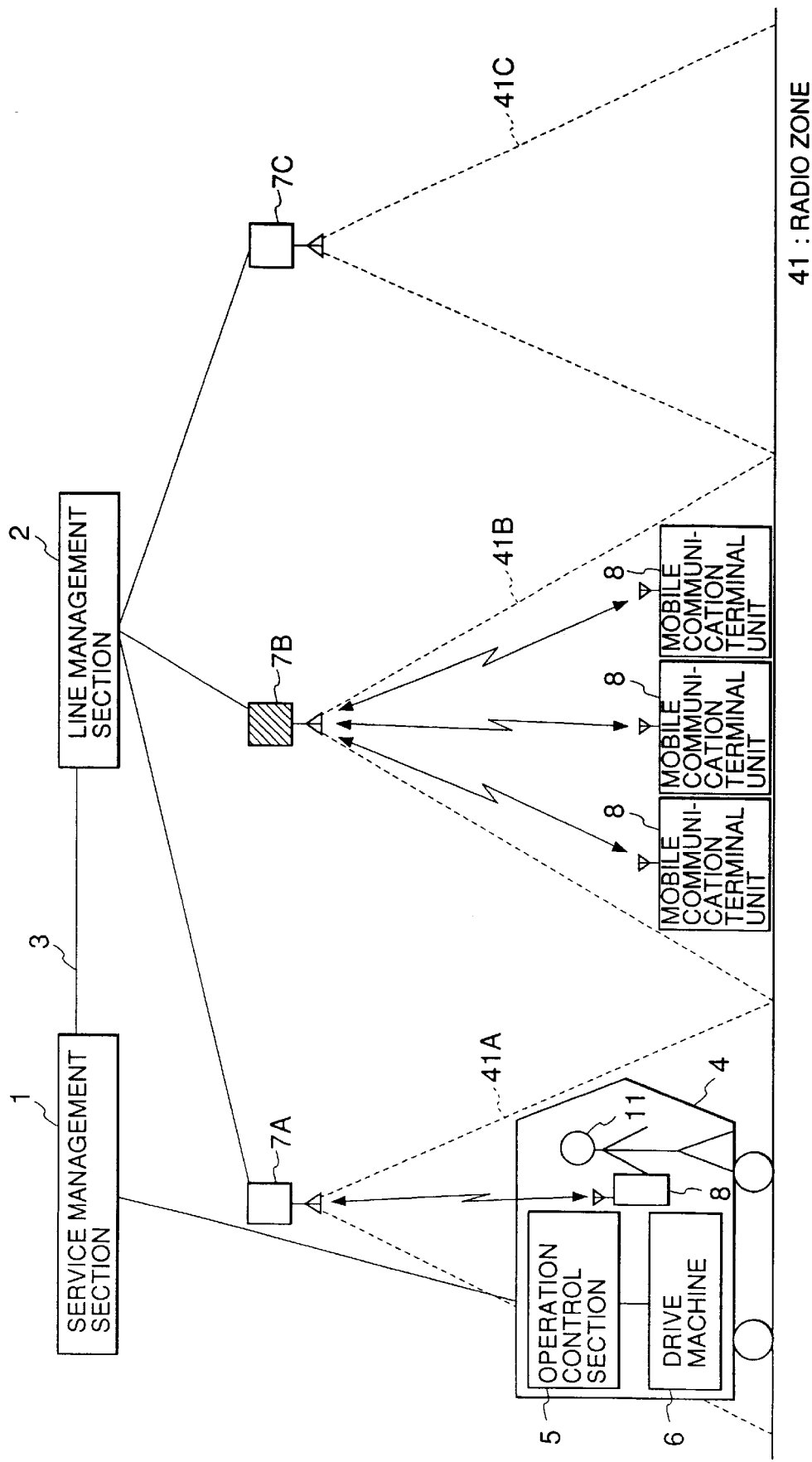
FIG. 6 is a block diagram showing a fourth embodiment of the first aspect of the mobile communication system according to the present invention.

The fourth embodiment of the first aspect of the present invention will be described hereinbelow with reference to FIGS. 6 and 7.

A service management section 1 of the traffic machine 4 and a line management section 2 for the mobile communication are connected by a data transmission path 3. The traffic machine 4 is movable in a two-dimensional way and has an operation control section 5 and a drive section 6 having a power for driving the traffic machine 4. A radio base station 7A is installed at the start position of the traffic machine 4, a radio base station 7C is installed at the destination position of the traffic machine 4, and a radio base station 7B is installed at an intermediate position of the traffic machine 4 between both. The reference numerals 8 denotes mobile communication terminal units, 11 denotes a mobile communication user within the traffic machine 4, and 41A to 41C are radio zones formed by the base stations 7A to 7C, respectively.

Figure 7:
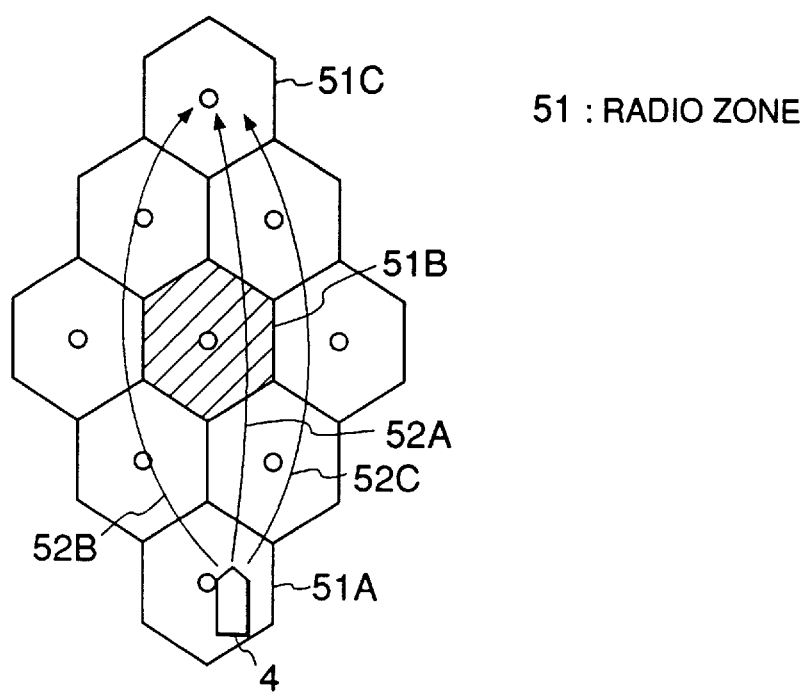
FIG. 7 is an illustration showing the operation of the fourth embodiment of the first aspect of the mobile communication system on a plane.

With reference to FIG. 7 (plane development view), 51A denotes the start radio zone of the traffic machine, 51B denotes a radio zone existing on a previously planed route, and 51C denotes the destination radio zone of the traffic machine. The above-mentioned radio zones 51A to 51C correspond to the radio zones 41A to 41C shown in FIG. 4, respectively. Further, 52A indicates a previously determined travel route of the traffic machine 4, and 52B and 52C denote two detour travel routes, respectively. Here, the assumption is made that the radio lines are congested in the radio zone 41B (or 51B).

The operation will be described hereinafter. The traffic machine 4 is driven by the power of the drive section 6 controlled on the basis of the operation command transmitted from the service management section 1. The radio base station 7 has a function for connecting the radio line to the mobile communication terminal unit 8. However, the radio base station 7 does not have data of the base stations other than itself. When the radio base station 7B detects a congestion (the radio lines are full used), the congestion data is transmitted to the line management section 2. The line management section 12 always checks the radio line congestion occurring at the respective radio base stations 7A to 7C, and transmits a number for discriminating the congested base station 7B to the service management section 1 via the data transmission path 3. On the basis of the transmitted congestion data, the service management section 1 transmits a command to the operation control section 5 of the traffic machine 4 so that the traffic machine 4 will not travel through the congested radio zone 51B for prevention of the communication line of the mobile communication user 11 from being interrupted; in other words, so that the traffic machine 4 will travel through the detour route (52B or 52C in FIG. 5). In this case, however, when a non-congested detour route is not found or when the detour route is too far or too long; that is, when the other service requirements of the traffic machine cannot be satisfied, the command is not transmitted. As described above, in this application, since the traffic machine 4 can travels only through the non-congested radio zones, it is possible for the mobile communication user to keep an excellent communications without interruption.

(Fifth embodiment)

Figure 8:
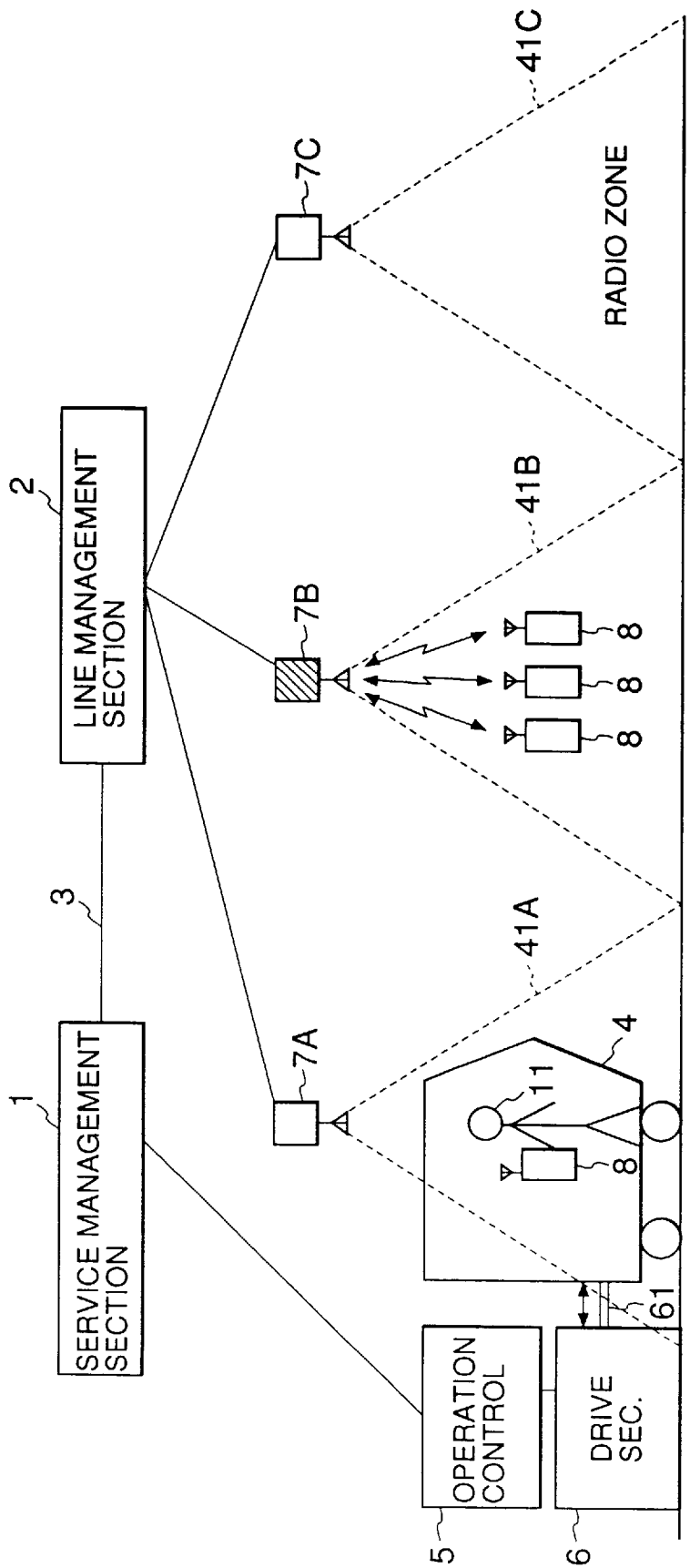
FIG. 8 is a block diagram showing a fifth embodiment of the first aspect of the mobile communication system according to the present invention.

A fifth embodiment of the first aspect of the present invention will be explained with reference to FIG. 8. In FIG. 8, an operation control section 5 and a drive section 6 of the traffic machine 4 are fixedly installed out of the traffic machine 4, and the traffic machine 4 is driven via a shift (or moving) device 61. In this embodiment, it is possible to obtain the same effect as with the case of the fourth embodiment.

(Sixth embodiment)

A sixth embodiment of the first aspect of the present invention will be explained with reference to FIG. 9. A service management section 1 for a traffic machine 4 and a line management section 2 for mobile communications are connected by a data transmission path 3. The travel path of the traffic machine 4 is controlled (checked and commanded) by the service management section 1. Further, 7A to 7D denote radio base stations; 51A to 51D denote radio zones formed by the radio base stations 7A to 7D, respectively; 11 denotes a mobile communication user having a mobile communication terminal unit and existing in the traffic machine 4; and 72 denotes a predetermined travel route of the traffic machine 4.

The operation will be explained. The service management section I transmits travel route data 72 of the traffic machine 4 to the line management section 2 via the date transmission line 3. Since the line management section 2 recognizes that the mobile communication user 11 communicating with the base station 7D exists in the traffic machine 4, when the traffic machine 4 is travelling in the radio zone 7A, the line management section 2 controls the radio line of the mobile communication user 11 so as to be previously connected to the frontward radio base station 7B determined on the basis of the travel route 72 of the traffic machine 4.

(Seventh embodiment)

A seventh embodiment of the first aspect of the present invention will be explained with reference to FIG. 10. In FIG. 10, a plurality of radio line managements 2A to 2D and a plurality of data transmission paths 3A to 3D are divided for each of a plurality of radio base stations 7A to 7D, respectively. The other elements are the same as with the case shown in FIG. 9, in which the same reference numerals have been retained.

The operation will be explained. The travel route data of the traffic machine 4 is transmitted from the service management section 1 to each of the line management sections 2A to 2C for each of the radio zones 7A to 7D. Each of the line management sections 2A to 2C controls only each of the base stations 7A to 7C. The operation other than the above is the same as with the case of the sixth embodiment.

(Eight embodiment)

Figure 11:
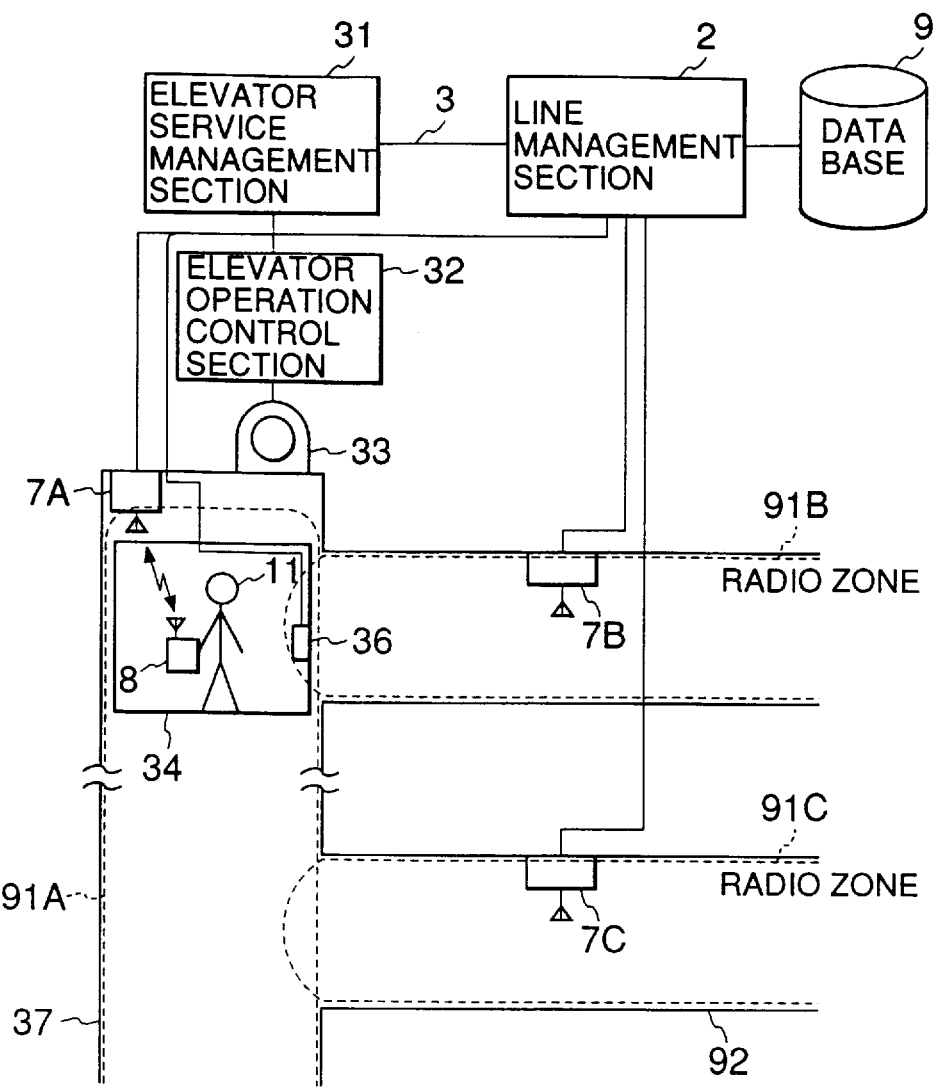
FIG. 11 is a block diagram showing eighth and ninth embodiments of the first aspect of the mobile communication system according to the present invention.

An eight embodiment of the first aspect of the present invention will be explained with reference to FIG. 11. In FIG. 11, an elevator service management section 31 and a line management section 2 for mobile communications are connected by a data transmission path 3. The reference numeral 7A denotes a radio base station having a radio zone 91A within a hoist-way 37 of an elevator; 7B and 7C denote radio base stations having radio zones 91B and 91C, respectively for each landing floor; 9 denotes a position data base for storing a radio terminal unit 8 or a position data of the mobile communication user 11; 32 denotes an elevator operation control section; 33 denotes an elevator hoist; 34 denotes an elevator cage; 36 denotes a stop-floor register device installed in the cage; and 92 denotes a destination floor of the mobile communication user 11.

The operation of the eighth embodiment will be explained. When the mobile communication user 11 gets on the elevator and then registers a destination landing floor by depressing a button on the stop floor register device 36 or the radio terminal unit 8, the register data is transmitted to the service management section 31, so that the operation control section 32 drives the hoist machine 33 on the basis of the command of the service management section 31 to move the cage. At the same time, the destination landing floor is transmitted to the line management section 2 via the data transmission path 3. Since the line management section 2 recognizes that the radio communication terminal unit 8 exists in the cage on the basis of the line data of the radio base station 7A in the cage, the radio line is allocated for the mobile communication user 11 at the destination landing floor 92 and further the position data base 9 is updated, on the basis of the cage-stop floor data transmitted by the service management section 31, before the cage reaches the destination landing floor 92 and therefore the radio communication terminal unit 8 hands off (switched to) from the radio zone 91A to the radio zone 91C.

(Ninth embodiment)

A ninth embodiment of the first aspect of the present invention will be described hereinbelow with reference to FIG. 9. In the eight embodiment, when the line management section 2 cannot allocates a radio line, until the mobile communication user 11 reaches the destination landing floor 92 and gets off the elevator to the floor (because the radio lines are congested at the radio base station 7C at the destination landing floor 92), the line management section 2 stores both the line numbers of the mobile communication terminal unit 8 and the radio base station 7C without connecting the mobile communication terminal unit 8 to the radio base terminal unit 7C, until the congestion of the radio lines at the radio base station 7C ends. However, upon the end of the congestion of the radio line at the radio base station 7C, the line management section 2 automatically reads the stored line numbers for line connection.

(Tenth embodiment)

A tenth embodiment of the first aspect of the present invention will be explained with reference to FIG. 12A. In FIG. 12A, an elevator service management section 31 and a line management section 2 for mobile communications are connected by a data transmission path 3. The reference numeral 7A denotes a radio base station installed in an elevator and having a radio zone within a hoist-way of the elevator; 7C denotes a radio base station having a radio zone 91C at a cage destination landing floor; 8 denotes a mobile communication terminal unit provided with such functions as to input a cage destination landing floor by the user and to effect mobile communication (e.g., telephone, data communication, etc.) and further to communicate with the radio base terminal unit 7A via radio line; 9 denotes a position data base for storing the radio terminal unit 8 or the position data of the mobile communication user 11; 11 denotes a mobile communication user; 32 denotes an operation control section of the elevator; 32 denotes an elevator operation control section; 33 denotes an elevator hoist; 34 denotes an elevator cage; 36 denotes a stop-floor register device installed in the cage; 37 denotes an elevator hoist-way; 92 denotes a destination floor of the mobile communication user 11.

The operation of the tenth embodiment will be described. When the mobile communication user 11 gets on the elevator cage 34 by carrying the mobile communication terminal unit 8 and then inputs input a destination landing floor, the destination data is transmitted from the mobile communication terminal unit 8 to the radio base station 7A. Further, the destination data is transmitted from the radio base station 7A to the service management section 31 and the line management section 2. On the basis of the transmitted destination data, the service management section 31 stops the cage at the destination landing floor 92.

On the other hand, as the first operation, when the mobile communication user 11 continues to speak with the use of the radio communication terminal unit 8 within the cage 34, the line management section 2 reserves the radio line of the mobile communication user 11 to the radio base station 7C at the destination landing floor 32 of the mobile communication user 11, before the mobile communication user 11 reaches the destination landing floor 92. Further, when the mobile communication user 11 reaches the destination landing floor 92 and gets off the elevator, the radio base station 7C connects the reserved line to the radio communication terminal unit 8. The number of reservations requested by the line management section 2 is equal to or less than the number of the mobile communication terminal units 8 which have registered a destination landing floor, respectively. Further, as the second operation, even when the mobile communication user 11 will not continue to speak by use of the radio communication terminal unit 8 within the cage 34, the line management section 2 updates the user's position data as data containing the destination landing floor 92 and the cage 34 in the position data base 9.

(Eleventh embodiment)

In this eleventh embodiment, as shown in FIG. 12B, the same operation as with the case or the eighth embodiment can be enabled by the mobile communication user 11 via the base station 7B installed on the starting landing floor 93, instead of the base station 7A installed in the hoist-way 37.

(Twelfth embodiment)

Figure 9:
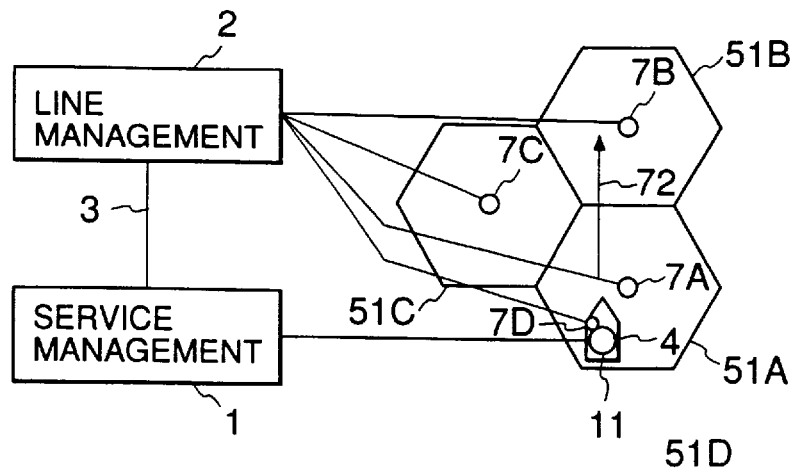
FIG. 9 is a block diagram showing a sixth embodiment of the first aspect of the mobile communication system according to the present invention.
Figure 10:
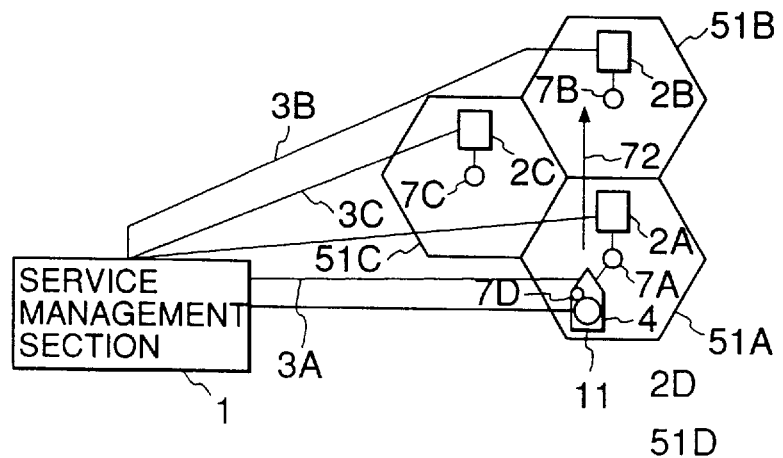
FIG. 10 is a block diagram showing a seventh embodiment of the first aspect of the mobile communication system according to the present invention.

In this twelfth embodiment, as shown in FIG. 12C, the same operation as with the case of the eighth embodiment (as shown in FIG. 9) can be enabled by installing the radio base station 7A in the cage 34, without installing in the hoist-way 37.

(Thirteenth embodiment)

Figure 13:
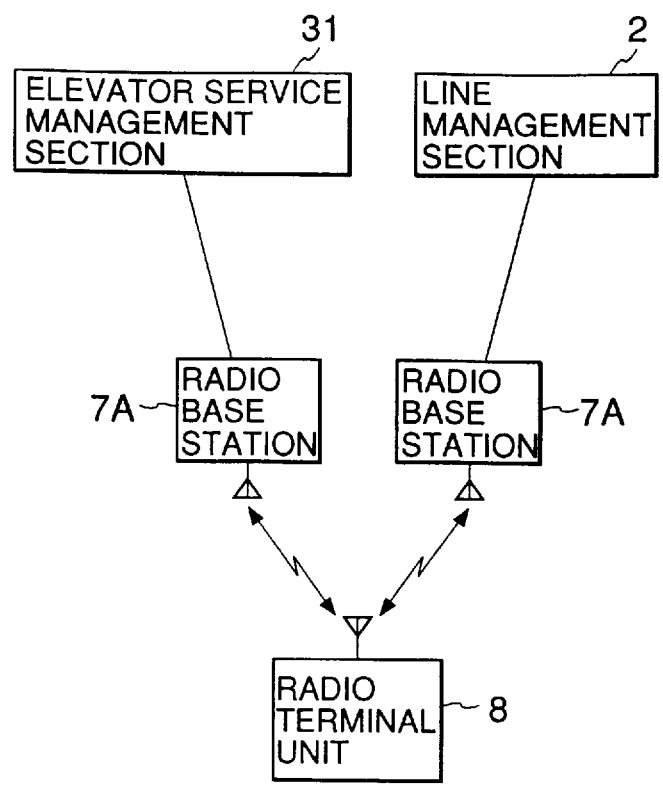
FIG. 13 is a block diagram showing a thirteenth embodiment of the first aspect of the mobile communication system according to the present invention.

In this thirteenth embodiment, as shown in FIG. 13, the same operation as with the case of the eighth, ninth and tenth embodiments can be enabled by installing the radio base station 7A for each of the service management section 31 and the line management section 2, respectively and separately.

(Fourteenth embodiment)

Figure 14:
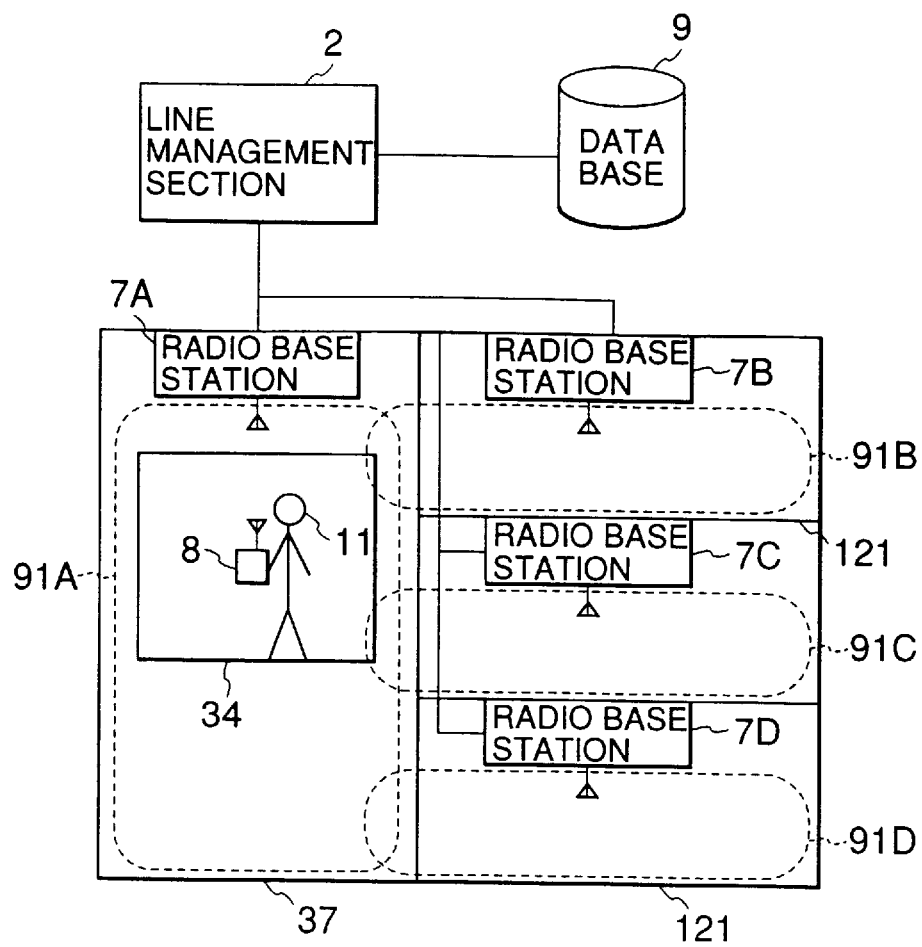
FIG. 14 is a block diagram showing fourteenth and twentieth embodiments of the first aspect of the mobile communication system according to the present invention.

The fourteenth embodiment will be explained with reference to FIG. 14. In FIG. 14, the numeral 2 denotes a line management section for mobile communications; 7A denotes a radio base station installed in a hoist-way 37 of an elevator; 7B to 7D denote ratio base stations installed in each of the landing floors 121; 11 denotes a mobile communication user getting on a cage 34 of the elevator; 8 denotes a radio communication terminal unit carried by the mobile communication user 11; and 91A to 91D denote radio zones formed by the radio base stations 7A to 7D, respectively.

The operation thereof will be described hereinbelow. When the mobile communication user 11 is in the cage 34, since the mobile communication terminal unit 8 carried by the user 11 is in the radio zone 91A formed in the hoist-way 37, the mobile communication terminal unit 8 is connected to the radio base station 7A. In this case, even if the cage 34 moves in the vertical direction, since the mobile communication terminal unit 8 is always in the same one radio zone 91A, even if the mobile communication terminal unit 8 is in communication, the hand-off control from the radio zone of the radio base station 7A to another radio zone of anther radio base station will not occur. In addition, since the mobile communication terminal unit 8 will not move between the radio zones, the position data of the mobile communication user 11 is not updated in the position data base 9. That is, even if the cage 34 moves up and down at a high speed, the control signal will not switched due to the hand off operation. Further, since the radio base station is not installed in the cage 34, it is unnecessary to provide a long communication cable according to the movement of the cage 34.

(Fifteenth embodiment)

The fifteenth embodiment will be described hereinbelow with reference to FIGS. 15 and 16. In FIG. 15, the reference numeral 131 is a switch node; 132 and 133 denote two radio base stations; 134 denotes a position register area of the mobile communication terminal unit 136 (which contains the radio base station 132); 135 denotes a position register area of the mobile communication terminal unit 136 (which contains the radio base station 133). Here, the two position register areas are adjacent to each other. Further, the reference numeral 137 denotes a position data base for storing position data of the mobile communication terminal unit 136.

On the other hand, in FIG. 16, the reference numerals 141 and 142 denote positions at which the mobile communication terminal unit 136 outputs an update request of the position data of the mobile communication terminal unit 136. The numerals other than above are the same as with the case those shown in FIG. 15.

In operation, in FIG. 13, the existing area 134 of the mobile communication terminal unit 136 is stored in the position data base 137. When the mobile communication terminal unit 136 is called from the switch node 131, only the base station in the position register area 134 containing the radio base station 132 adjacent to the mobile communication terminal unit 136 is called. When the mobile communication terminal unit 136A moves to the vicinity of the end portion of the position register area 134, the mobile communication terminal unit 136A transmits a position register update request signal to the radio base station 133. Upon reception of the position register update request signal of the radio base station 133, the switch node 131 updates the position data of the mobile communication terminal unit 136A in the position data base 137 from the area 134 to the area 135. The position data is updated a random time after the reception field strength has dropped below a certain numerical value at the mobile communication terminal unit 136. This numerical value is determined to be slightly higher than the reception field strength at the hand-off of the radio communication line during communication. Therefore, as shown in FIG. 14(a), when the mobile communication terminal units 136A to 136C move to the radio zone 143, positions at which the position data are updated can be scattered to positions 141A to 141C near the end of the position register area 144.

(Sixteenth embodiment)

Figure 16B:
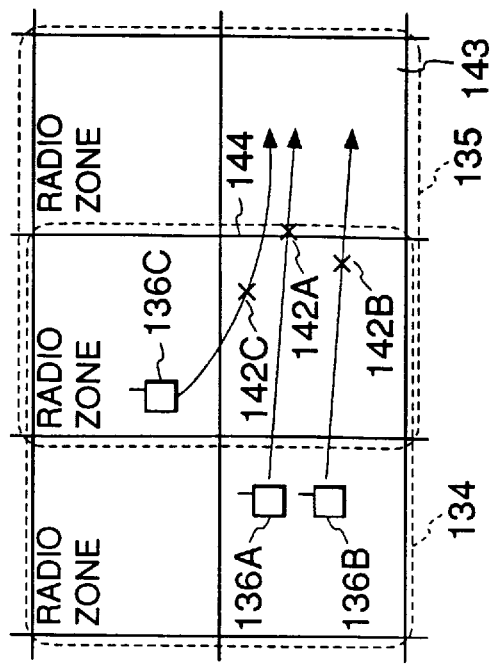
FIG. 16B is a block diagrams showing sixteenth embodiment of the first aspect of the mobile communication system according to the present invention.
Figure 16A:
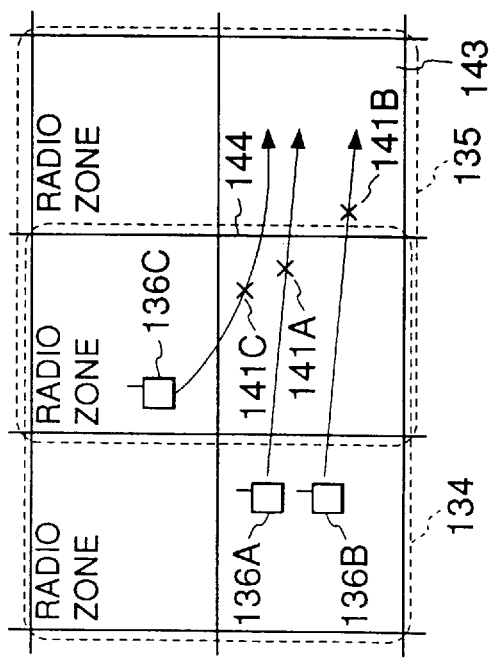
FIG. 16A is a block diagram showing fifteenth embodiment of the first aspect of the mobile communication system according to the present invention.

The positions at which the position data are updated can be scattered to positions 142A to 142C all within only the position register area 134 before updated, as shown in FIG. 16B, which is different from the fifteenth embodiment shown in FIG. 16A in which the scattered position 141B is in the position register area 135.

(Seventeenth embodiment)

Figure 17:
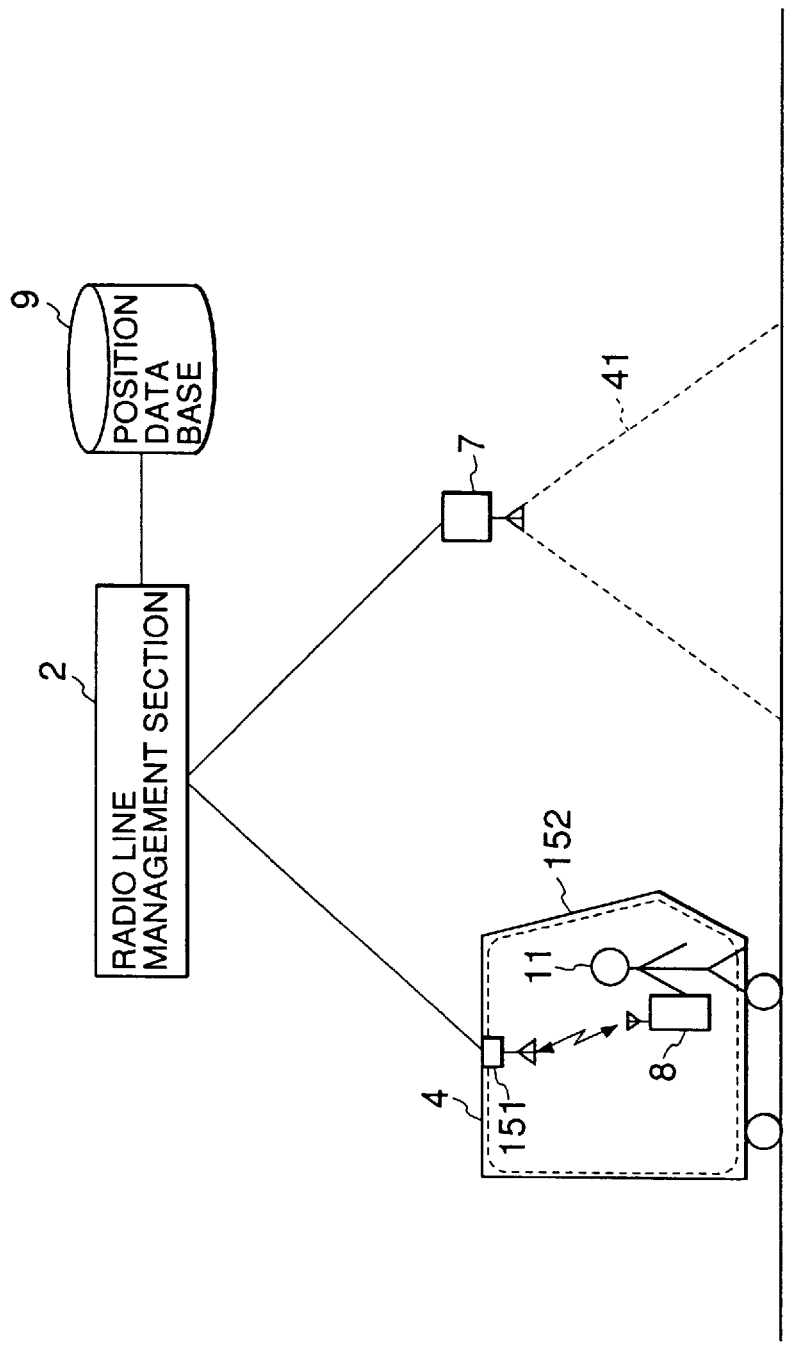
FIG. 17 is a block diagram showing a seventeenth embodiment of the first aspect of the mobile communication system according to the present invention.

In FIG. 17, the reference numeral 2 denotes a radio line management section; 4 denotes a traffic machine; 7 denotes a radio bass station; 8 denotes a mobile communication terminal unit carried by a mobile communication user 11 in the traffic machine; 9 denotes a position data base for storing the position data of the mobile communication user 11; 41 denotes a radio zone of the radio base station 7; 151 denotes a radio base station having a radio zone in the traffic machine 4; and 152 denotes a radio zone formed by the radio base station 151 in the traffic machine 4.

On the other hand, FIG. 18 is a development plane view of FIG. 17, in which the same reference numerals have been retained for the similar elements which have the same functions as with the case shown in FIG. 17.

In operation, in FIG. 17, when the mobile communication user 11 is on the ground as a walker, the user can communicate by use of the mobile communication terminal unit 8 in the radio zone 41. In this case, since the mobile communication terminal unit 8 communicates with the base station 7, the line management section 2 registers the position of the mobile communication user 11 in the position data base 9 as the ground area. Further, when the mobile communication user 11 is in the traffic machine 4, the user 11 uses the mobile communication terminal unit 8 from within the radio zone 152. In this case, since the mobile communication terminal unit 8 communicates with the base station 151 having the radio zone in the traffic machine 4, the line management section 2 registers the position of the mobile communication user 11 as an intra-traffic machine (does not register as the ground position). These position register areas are shown in FIGS. 18A and 18B, respectively. In FIG. 18A, since the mobile communication user 11 or the mobile communication terminal unit 8 is registered in the traffic machine 4, when the line management section 2 shown in FIG. 17 calls the terminal unit 8, only the position register area shown by oblique lines is called. On the other hand, in FIG. 18B, since the mobile communication user 11 or the mobile communication terminal unit 8 is registered on the ground, when the line management section 2 shown in FIG. 15 calls the terminal unit 8, the ground position register areas shown by oblique lines are all called. In FIG. 18B, although the traffic machine 4 is out of the position register area, the operation is quite the same as with the case when the traffic machine 4 is in the position register area.

(Eighteenth embodiment)

In FIG. 19A, the reference numeral 8 denotes a mobile communication terminal unit carried by a mobile communication user 11; 34 is an elevator cage; and 37 denotes a hoist-way of an elevator.

In operation, when the mobile communication user 11 or the mobile communication terminal unit 8 gets on the elevator cage 34, the position register area is determined as in the cage 34, without registering other landing floors, as shown in FIG. 19A.

(Nineteenth embodiment)

In operation, when the mobile communication user 11 or the mobile communication terminal unit 8 gets on the elevator cage 34, the position register area includes a part of the landing floors, in addition to the cage 34, as shown in FIG. 19B.

(Twentieth embodiment)

Figure 20:
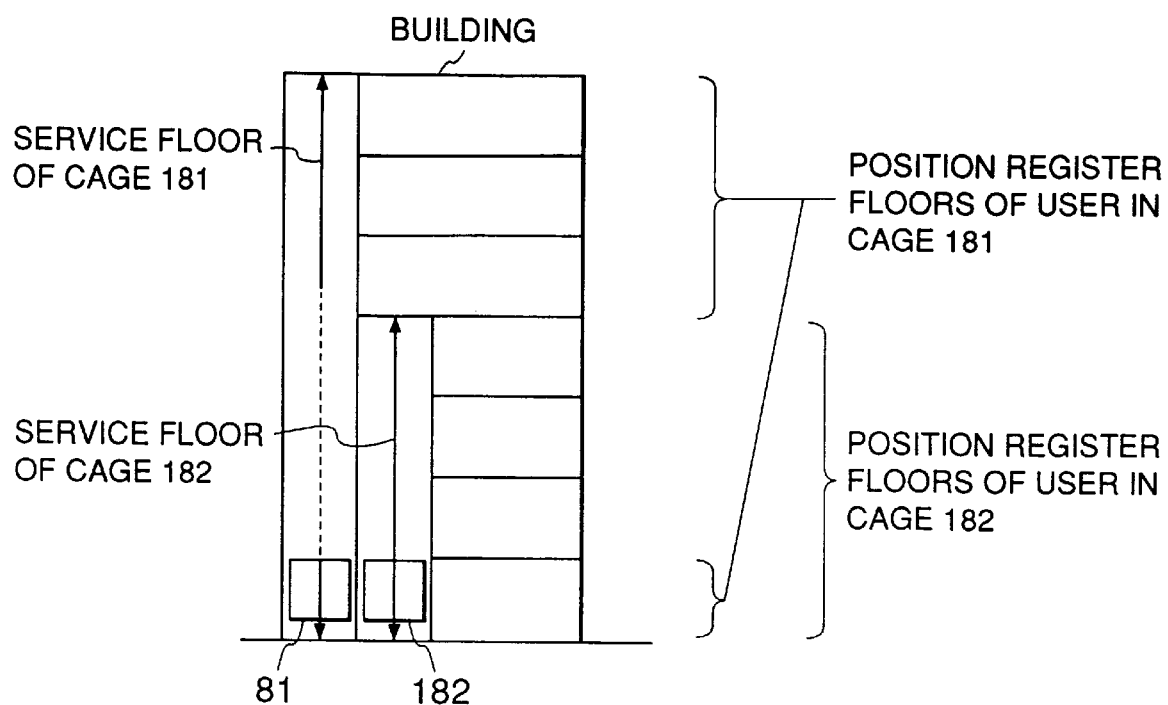
FIG. 20 is an illustration for assistance in explaining the position register areas of the twentieth embodiment of the first aspect of the mobile communication system according to the present invention.

In FIG. 20, the reference numeral 181 and 182 denote two elevator cages of different service landing floors.

In operation, with reference to FIG. 14 (for twelfth embodiment), when a mobile communication user 11 having a mobile communication terminal unit 8 gets on the cage 34, since the radio base station 7A senses the mobile communication terminal unit 8 and the getting-on of the mobile communication user 11, the radio base station 7A transmits the number of the cage to which the mobile communication user 11 gets on to the radio line management section 2. The radio line management section 2 stores the service floor number, and registers the intra-cage and the service landing floor as the position of the mobile communication user 11 or the mobile communication terminal unit 8. The above-mentioned operation can be made for each of the two elevators 181 and 182.

(Twenty-first embodiment)

Figure 21:
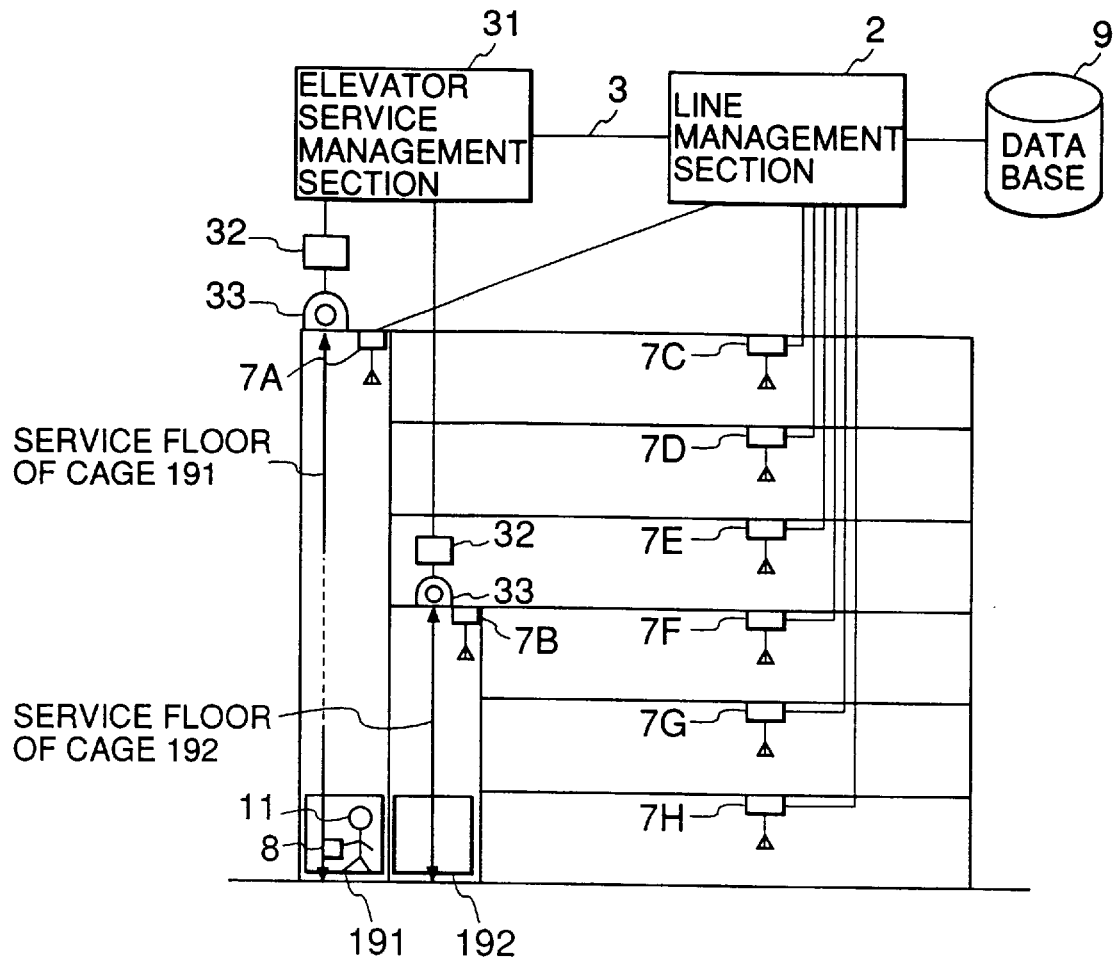
FIG. 21 is a block diagram showing twenty-first and twenty-second embodiments of the first aspect of the mobile communication system according to the present invention.

In FIG. 21, the reference numeral 31 denotes a service management section of an elevator; 2 denotes a radio line management section; 3 denotes a data transmission line between both the sections 31 and 2; 7A and 76 denote two radio base stations having two radio zones in two hoist-ways of two cages 191 and 192, respectively; 76 to 7G denote radio base stations for each landing floor; 9 denotes a data base for storing the position data of the mobile communication terminal units or the mobile communication users; 11 denotes mobile communication user having the mobile communication terminal unit 8 and getting on one of two cages 191 and 192 of different service landing floors; and 32 denotes an operation control section for controlling a hoist machine 33 in accordance with a command of the service management section 31.

In operation, in FIG. 21, when the mobile communication user 11 gets on one of the cages 191 and 192 and designates a destination landing floor with a button, the service management section 31 transmits the cage stop floor data to the line management section 2 via the data transmission path 3. The line management section 2 receives the position register request signal outputted by the mobile communication terminal unit 8 via the radio base station 7A or 7B. Further, the line management section 2 registers the position register area of the mobile communication terminal unit 8 or the mobile communication user 11 stored in the position data base 9, as the intra-cage data and the stopped landing floor data, on the basis of the cage stop data in the radio zone of the radio base station received by the service management section 31.

(Twenty-second embodiment)

In FIG. 21, the destination landing floor data and the number of the mobile communication terminal unit 8 or the mobile communication user 11 are transmitted to the line management section 2 together with the position register request signal. The line management section 2 registers the position register area of the mobile communication terminal unit 8 or the mobile communication user 11 stored in the position data base 9, by limiting only to the intracage data and the destination landing floor data of the mobile communication user 11.

[Second aspect]

Figure 22:
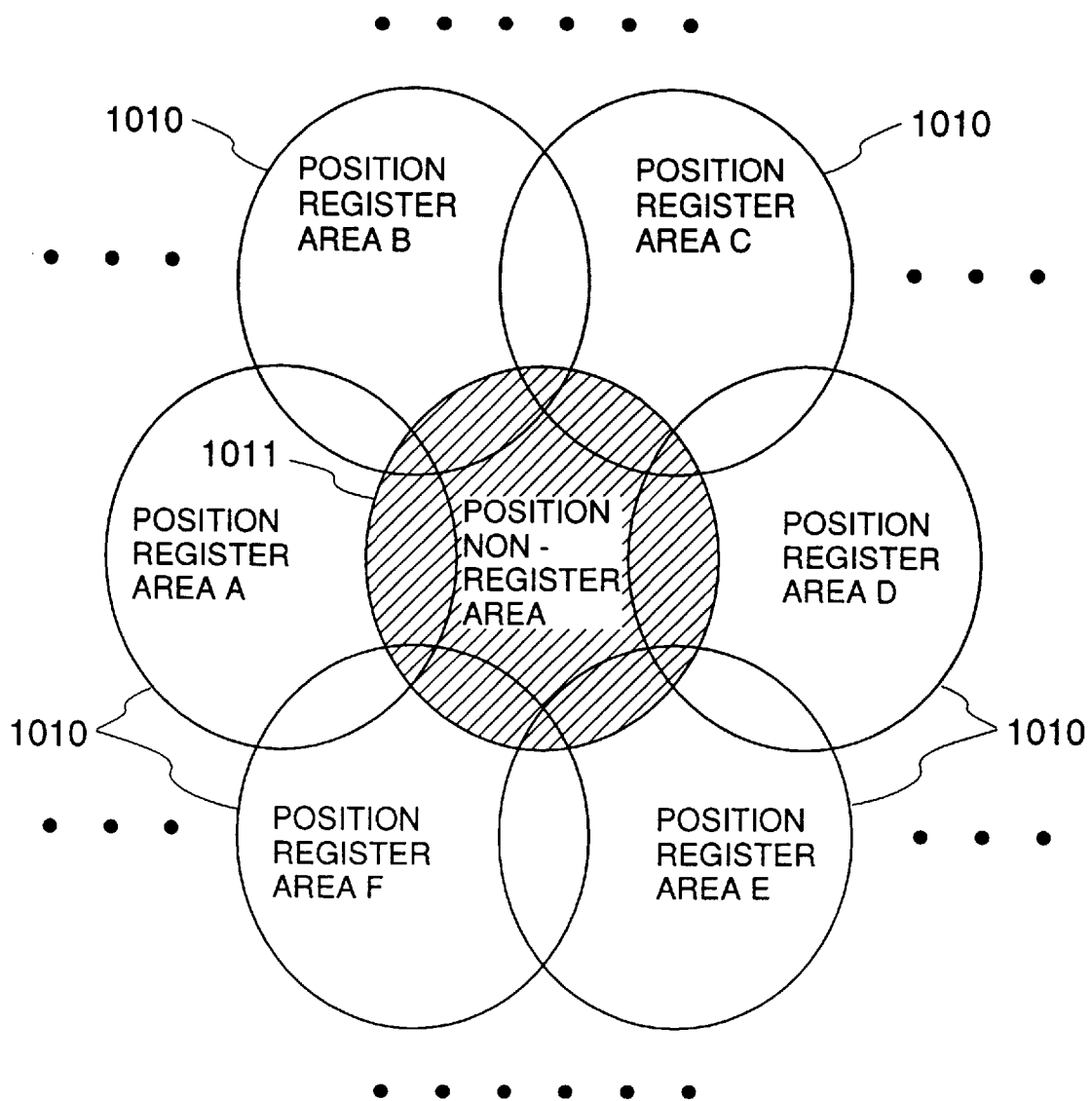
FIG. 22 is a block diagram showing first and second embodiments of the second aspect of the mobile communication system according to the present invention.

FIG. 22 is a block diagram showing the second aspect of the mobile communication system according to the present invention. This mobile communication system is composed of at least one position register area 1010 and at least one position non-register area 1011. The position of a mobile body existing in the position register area 1010 is registered, and the position of a mobile body existing in the position non-register area 1011 is not registered.

(First embodiment)

Figure 23B:
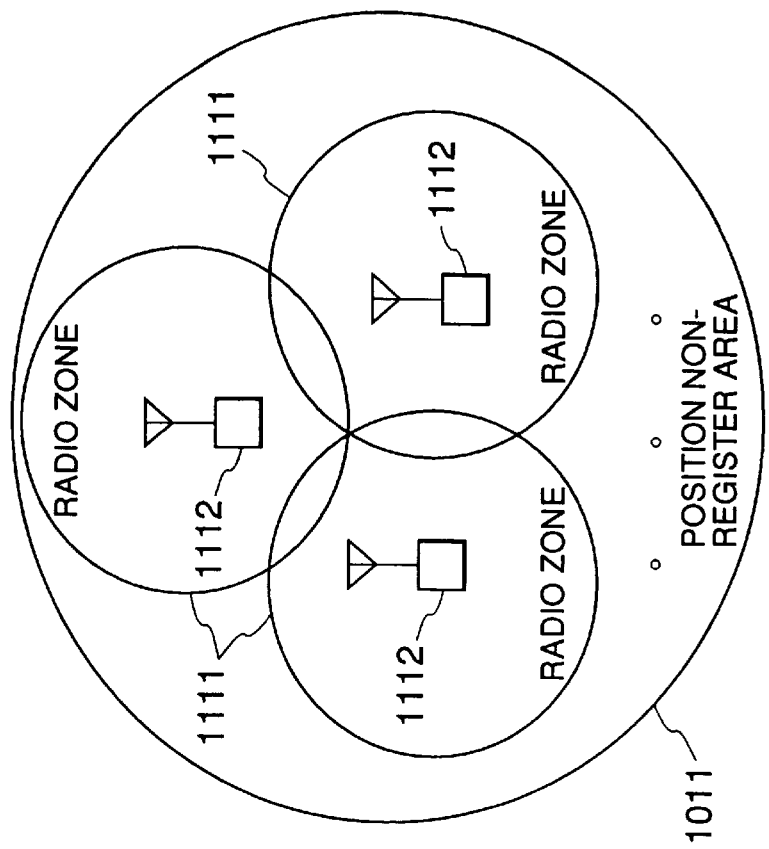
FIGS. 23A and 23B are block diagrams showing the construction of the position register area and position non-register area.
Figure 23A:
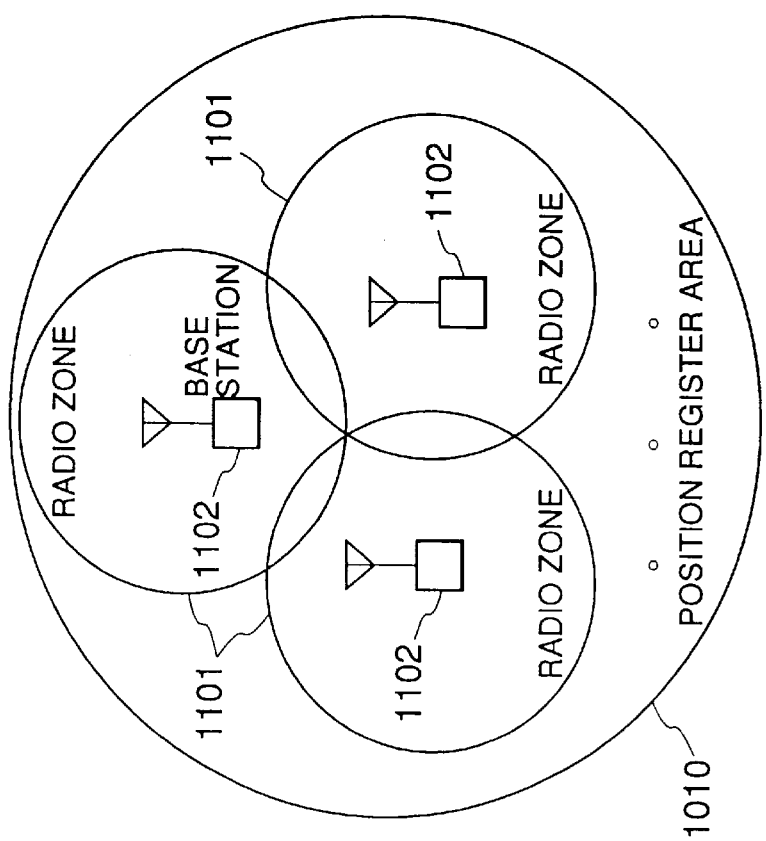

As shown in FIG. 23A, the position register area 1010 is composed of at least one radio zone 1101. Therefore, communication service can be given to the mobile body in the radio zone 1101 via a radio base station 1102 for forming the radio zone 1101. On the other hand, as shown in FIG. 23B, the position non-register area 1011 is composed of at least one radio zone 1111. Therefore, communication service can be given to the mobile body in the radio zone 1111 via a radio base station 1112 for forming the radio zone 1111.

The operation of the position register method of the mobile communication system constructed as described above will be described hereinbelow. In FIG. 23, when a mobile body whose position is registered in the position register area A1010 is moved out of the position register area A1010 into the radio zone 1111 included in the position nonregister area 1011, the position is not registered so that the mobile body is kept registered in the position register area A1010 as it is, with the result that it is possible to reduce the traffic (call capacity) of position registers.

(Second embodiment)

The construction of this second embodiment is the same as with the case of the first embodiment shown in FIG. 22.

The operation of the position register method will be described hereinbelow. The area to which many mobile bodies enter in a short time is kept as position nonregister area 1011 for a short time. The positions of the mobile bodies going out of the respective position register areas 1010 and then coming into the position non-register area 1011 are not registered, so that the position registers thereof are kept at the respective position register areas 1010 as they are. As a result, even if the many mobile bodies come into the position non-register area 1011 in a short time, it is possible to prevent the traffic (call capacity) of the position register from being increased. Further, after that, even when the mobile bodies go out of the position non-register area 1011 and return to the position register area 1010 (at which the positions thereof have been registered), it is unnecessary to register the positions again, so that it is possible to prevent the position register traffic from being increased.

The operation of the call method in the mobile communication system constructed as described above will be described hereinbelow. The case where the mobile body whose position is registered in the position register area A1010 is called will be explained hereinbelow. In the mobile communication system, since the position register method of the first aspect is adopted, there exists a possibility that the mobile body registered in the position register area A1010 exists in the position register area A1010 or the position non-register area 1011. Therefore, when the mobile body is called, the mobile body is called in at least one radio zone 1011 within the position register area A1010. If not connected to the mobile body in a predetermined time, the mobile body is called in at least one radio zone 1111 within the position non-register area 1010. As a result, it is possible to reduce the traffic of the position registers, as compared with when the position nonregister area 1011 is determined as one of the position register area. Further, it is possible to reduce the traffic of the calls, as compared with when the position register area A1010 and the position non-register area are determined as the same position register areas.

(Third embodiment)

Figure 24:
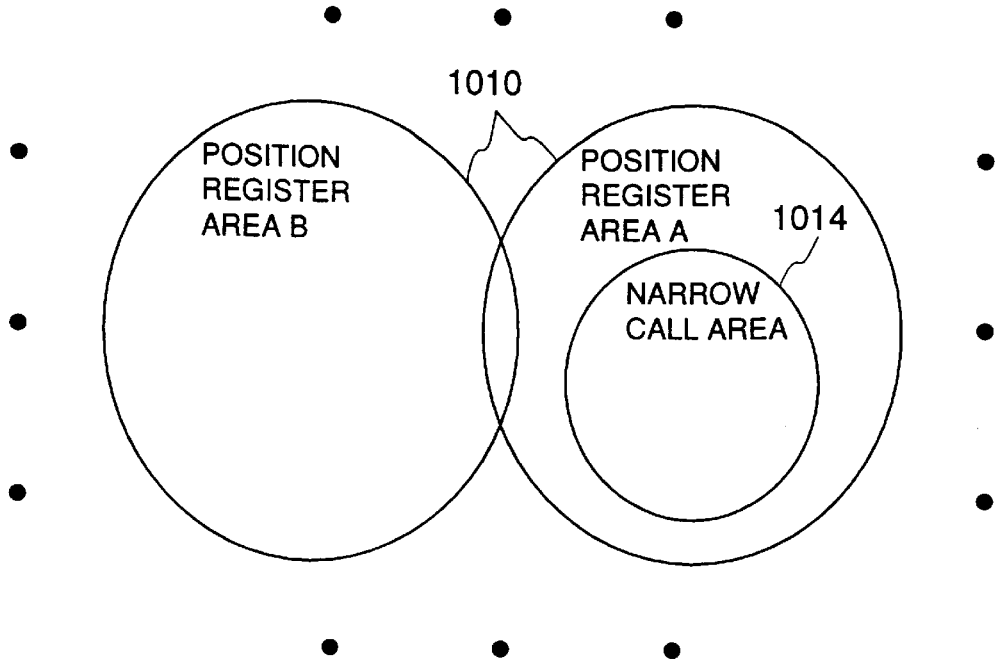
FIG. 24 is a block diagram showing a third embodiment of the second aspect of the mobile communication system according to the present invention.

In FIG. 24, the mobile communication system is constructed by including at least one position register area 1010. The position register area 1010 is constructed by including at least one radio zone 1101 as shown in FIG. 21(A), so that the communication service can be given to the mobile body in the radio zone 1101 via the radio base station 1102 for forming the radio zone 1101.

The operation of the position register method in the mobile communication system as constructed above will be described hereinbelow. A mobile body which goes out of the position register area B1010 and then registered in the position register area A1010 will be explained. The call area to the mobile body is equal to the position register area A1010 from when the mobile body has been registered in the position register area A1010 to when a predetermined constant time has elapsed. After the predetermined constant time has elapsed, the call area for the mobile body is changed to a narrow call area 1014 including the radio zone 1101 (in which the mobile body now exists) and constructed by at least one radio zone 1101 (whose number is less than that of the position register area A1010). Therefore, when the mobile body stays at the same position register area for many hours, since the call area can be composed of the radio zones whose number is smaller than the call areas for the mobile body, in particular when the mobile body is called often, it is possible to reduce the traffic of the calls for the mobile body markedly.

(Fourth embodiment)

Figure 25:
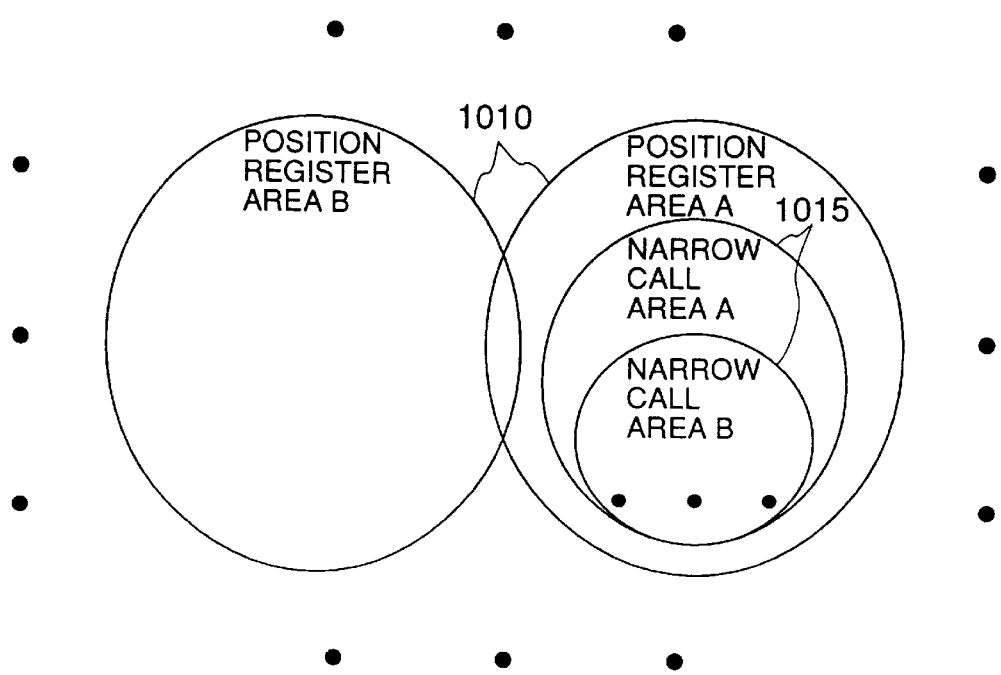
FIG. 25 is a block diagram showing a fourth embodiment of the second aspect of the mobile communication system according to the present invention.

In FIG. 25, the mobile communication system is constructed by at least one position register area 1010. As shown in FIG. 23A, the position register area 1010 is constructed by including at least one radio zone 1101, so that communication service can be given to the mobile body in the radio zone 1101 via a radio base station 1102 for forming the radio zone 1101.

The operation of the position register method in the mobile communication system as constructed above will be explained hereinbelow.

In the case where the mobile body goes out of the position register area B1010 and registered in the position register area A1010, if the position thereof is not registered in a predetermined time or longer, the call area is changed to a narrow call area A1015 in accordance with the position register method as already explained. After that, when the call area of the mobile body is not changed for a predetermined constant time or longer, the call area is constructed by at least one radio zone including the radio zone 1101 (in which the mobile body exists) and whose number is smaller than that of the narrow call areas A1015. Further, after a predetermined constant time has elapsed, when the call area for the mobile body is not changed, the call area for the mobile body is changed to a narrower call area composed of at least one radio zone including the radio zone 1101 (in which the mobile body exists) and whose number is further smaller than that of the narrow call areas A1015. As described above, it is possible to change the call area, where necessary, until the call area is composed of only one of the radio zone 1101. As a result, the call areas for the mobile body can be composed of a smaller number of radio zones with increasing time during which the mobile body stays in the same position register area. Therefore, in particular when the mobile body is called often, it is possible to reduce the traffic of calls to the mobile body markedly.

(Fifth embodiment)

Figure 26:
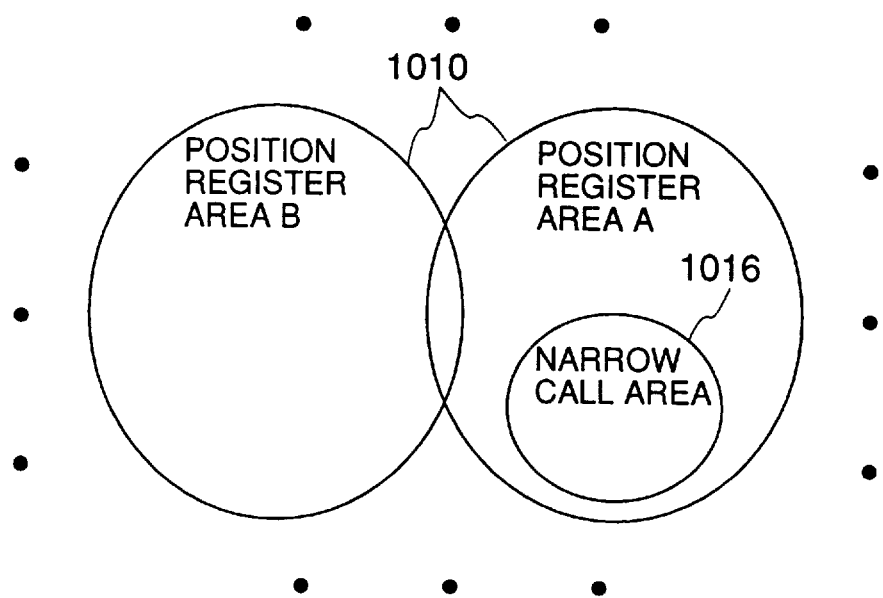
FIG. 26 is an illustration showing a fifth embodiment of the second aspect of the mobile communication system according to the present invention.

In FIG. 26, the mobile communication system is composed of at least one position register area 1010. As shown in FIG. 23A, the position register area 1010 is composed of at least one radio zone 1101, so that communication service is given to the mobile body in the radio zone 1101 via the radio base station 1102 for forming the radio zone 1101.

Here, the operation of call method in the mobile communication system constructed as described above will be explained. The case will be explained where after the mobile body goes out of the position register area B1010 and therefore registered in the position register area A1010, the position is not registered for a predetermined constant time or longer and further when the call areas for the mobile body is changed several times to a narrow call area 1010 in accordance with the above-mentioned position register methods (because the call area is not changed for many hours), so that a narrow call area 1010 is set. In this case, when the mobile body is called, the mobile body is first called in at least one radio zone 1101 of the narrow call area 1010. Here, in case the mobile body cannot be connected in a predetermined constant time, the mobile body is called in at least one radio zone 1101 within the position register area A1010 (not included in the narrow call area 1016). As a result, it is possible to reduce the traffic of calls to the mobile body staying at the same position register area for many hours.

(Sixth embodiment)

Figure 27A:
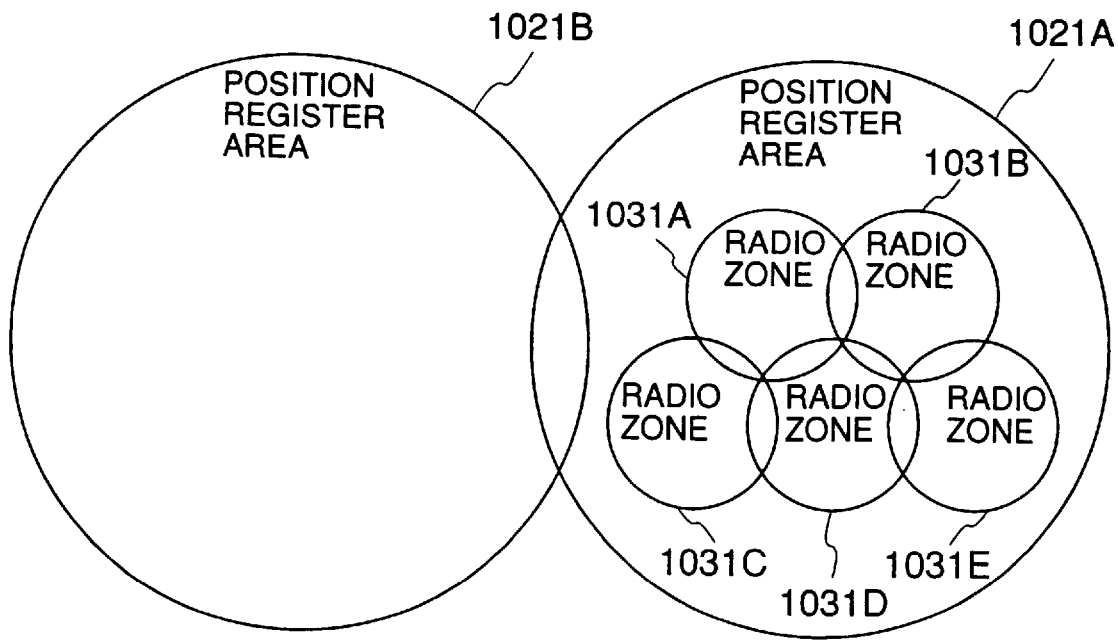
FIGS. 27A and 27B are block diagrams showing a sixth embodiment of the second aspect of the mobile communication system according to the present invention.
Figure 27B:
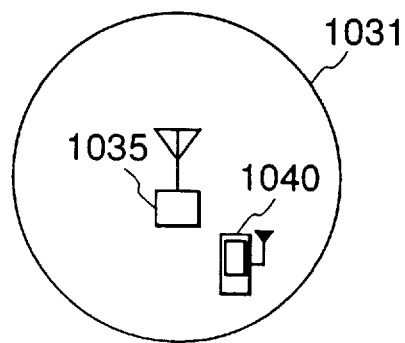

In FIGS. 27A and 27B, the mobile communication system is constructed by including at least one position register area 1021. Further, the position register area 1021 is constructed by including at least one radio zone 1031. Therefore, communication service is rendered to the mobile body 1040 in the radio zone 1031 via a radio base station 1035 for forming the radio zone 1031.

An example of the call method of the mobile communication system constructed as described above will be explained hereinbelow, by taking the where the call area of the mobile body is set to the radio zone 1031 existing at the call end of the mobile body 1040; when the mobile body 1040 is called without registering a new position, the mobile body is called only in the radio zone 1031; and when the mobile body 1040 does not respond, the mobile body 1040 is called by a radio zone 1031 in a position register area 1021 at which the mobile body 1040 is registered (other than the radio zone 1031).

Here, the case will be explained when the mobile body 1040 goes out of the position register area 1021B and then registered in the position register area 1021A. Since the mobile body 1040 has been registered in the position register area 1021A, when the mobile body 1040 calls or is called and thereby when the outgoing call from or the incoming call to the mobile body 1040 ends at the time when the mobile body 1040 exists in the radio zone 1031D within the position registered area 1021A, the call area of the mobile body 1040 is set to the radio zone 1031D due to the call area narrowing procedure. After that, the mobile body 1040 is next called, the mobile body 1040 is called only in the radio zone 1031D. When the mobile body 1040 stays in the radio zone 1031D, it is possible to connect the incoming call to the mobile body 1040 by the calling.

When the mobile body 1040 is moved from the radio zone 1031D to another radio zone 1031, the mobile body 1040 is called in the radio zone 1031 other than the radio zone 1031D within the position register area 1021A at which the position of the mobile body 1040 is registered. That is, when the mobile body 1040 is moved from the radio zone 1031D to the radio zone 1031, it is possible to connect an incoming call to the mobile body 1040 by the calling.

By the above-mentioned operation, when the mobile body staying within a single radio zone calls or is called, the call area of the mobile body is only the above-mentioned radio zone, so that it is possible to reduce the traffic of calls, as compared with the call method such that the mobile body is called in all the radio zones within the position registered area. Further, when the mobile body moves from the radio zone to another radio zone, the traffic of position registers will not occur. In this case, however, it is possible to call the mobile body.

Further, when the time during which the call area of the mobile body 1040 is set to the radio zone 1031D due to the call area narrowing method exceeds a predetermined value, it is also possible to set the call area to a greater number of radio zones 1031 including the radio zone 1031D. Owing to the above-mentioned operation, even when the mobile body moves from the radio zone 1031D to the other radio zone 1031, it is possible to reduce the traffic of calls, as compared with the method such that the mobile body is called in all the radio zones 1031 within the position register area 1021A. Further, when the mobility of the mobile body 1040 is large, it is possible to reduce a delay of an incoming call connection thereto due to twice calls.

Further, it is possible to narrow the call area in response to a request from the mobile body 1040. For instance, the mobile body 1040 measures the mobility thereof. If the measured mobility is less than a predetermined value, at a call end, the mobile body 1040 requests a narrower call area via the radio base station 1035. When the mobility is more than a predetermined value, the narrower call area is not requested. Therefore, the call area is narrowed for only the mobile body which requests the narrower call area, so that the Call area can be narrowed to the radio zone 1031 at which the mobile body exists at the end of call.

As described above, since the call area of the mobile body of less mobility can be narrowed (while keeping the call area of the mobile body of a large mobility at the value set in the position register area), the traffic of calls to the mobile body of a small mobility can be reduced. On the other hand, an incoming call can be connected to the mobile body of large mobility by only a single call, without increasing a delay of incoming call connection to the mobile body.

(Seventh embodiment)

Figure 28A:
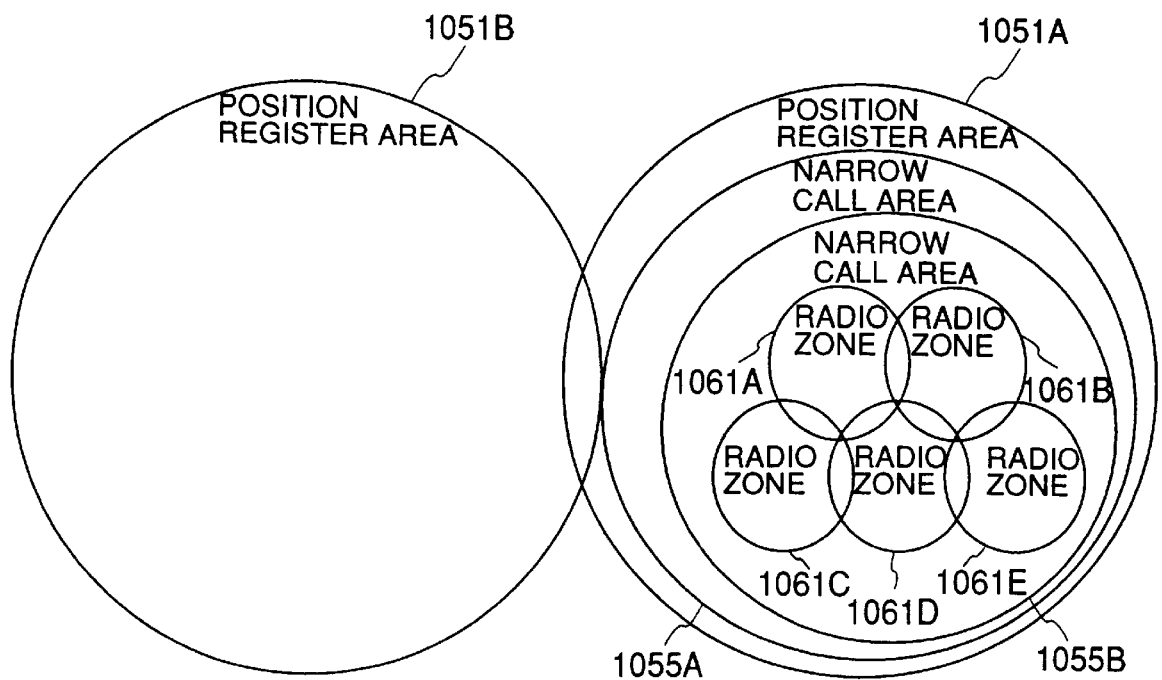
FIGS. 28A and 28B are illustrations showing a seventh embodiment of the second aspect of the mobile communication system according to the present invention.
Figure 28B:
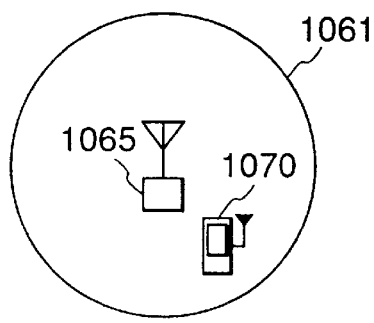

In FIGS. 28A and 28B, the mobile communication system is constructed by including at least one position register area 1051. Further, the position register area 1051 is constructed by including at least one radio zone 1061. Therefore, communication service is rendered to a mobile body 1070 in a radio zone 1061 via a radio base station 1065 for forming the radio zone 1061.

An example of the calling method of the mobile communication system constructed as described above will be explained hereinbelow by taking the case where the call area of the mobile body is set to a call area 1055 including the radio zone 1061 existing at the call end of the mobile body 1070 and further narrower than the position register area 1051, when a new position of the mobile body 1070 is not registered and further the mobile body 1070 is called, the mobile body is called by only the narrow call area 1055; and when the mobile body 1070 does not respond, the mobile body 1070 is called in a radio zone 1061 within a position register area 1051 in which the mobile body 1070 is registered (other than the narrower call area 1055).

Here, the case will be explained when the mobile body 1070 goes out of the position register area 1051B and then registered in the position register area 1051A. Since the mobile body 1070 has been registered in the position register area 1051A, when the mobile body 1070 calls or is called and thereby the outgoing call from or the incoming call to the mobile body 1070 ends at the time when the mobile body 1070 exists in the radio zone 1061D within the position registered area 1051A, the call area of the mobile body 1070 is set to the narrower call area 1055A due to the call area narrowing procedure. After that, the mobile body 1070 is next called, the mobile body 1070 is called in the radio zone 1061 within the narrower call area 1055A.

When the mobile body 1070 stays in the narrower call area 1055A, it is possible to connect the incoming call to the mobile body 1070 by the calling. When the mobile body 1070 is moved from the narrower call area 1055A to the area other than the narrower call area 1055A, the mobile body 1070 is called in the radio zone 1061 other than the narrower call area 1055A within the position register area 1051A at which the position of the mobile body 1070 is registered. That is, when the mobile body 1070 is moved from the area other than the narrow call area 1055A by the calling, it is possible to connect an incoming call to the mobile body 1070 by the calling.

Further, after the call area has been narrowed and further set to the narrow call area 1055 by the abovementioned operation, it is possible to further narrow the set call area of the mobile body. The case where the mobile body 1070 is registered to the position register area 1051A and further set to the narrowed call area 1055A will be explained.

When the mobile body 1070 calls or is called and the outgoing call of the mobile body 1070 ends during when the mobile body 1070 exists in the radio zone 1061E within the narrow call area 1055A, the call area of the mobile body 1070 is set to the narrow call area 10558 including the radio zone 1061E but narrower than the narrow call area 1055A due to the call area narrowing procedure.

After that, the mobile body 1070 is next called, the mobile body 1070 is called in the radio zone 1061 within the narrower call area 1055B. When the mobile body 1070 stays in the narrower call area 1055B, it is possible to connect the incoming call to the mobile body 1070 by the calling. When the mobile body 1070 is moved from the narrower call area 1055B to the area other than the narrower call area 1055B, the mobile body 1070 is called in the radio zone 1061 other than the narrower call area 10558 within the position register area 1051B at which the position of the mobile body 1070 is registered. That is, when the mobile body 1070 is moved from the area other than the narrow call area 1055B by the calling, it is possible to connect an incoming call to the mobile body 1070 by the calling.

By the above-mentioned operation, when the mobile body staying within the narrow area calls or is called, the call area of the mobile body becomes the narrow call area narrower then the position registered area, so that it is possible to reduce the traffic of calls, as compared with the call method such that the mobile body is called in all the radio zones within the position registered area. Further, since the call area is not narrowed in a short time, there exists a possibility that an incoming call can be connected immediately to the mobile body of a large mobility, so that it is possible to decrease a delay of connection of an incoming call to the mobile body.

Further, when the mobile body moves out of the narrower call area, the traffic of the position register will not occur, so that the mobile body can receives an incoming call. Further, since the call area of the mobile body staying in a narrow area for a long time can be narrowed whenever a call occurs, it is possible to further reduce the traffic of calls.

Further, during the above-mentioned operation, when the time during which the call area of the mobile body 1070 is set to the narrow call area 1055 due to the call area narrowing procedure exceeds a predetermined value, it is also possible to set the call area to another call area constructed by radio zones 1031 whose number is larger than that of the narrowed call area 1055. Owing to the above-mentioned operation, even when the mobile body moves out of the narrow call area 1055, it is possible to reduce the traffic of calls. Further, when the mobility of the mobile body 1070 is large, it is possible to reduce a delay of an incoming call connection thereto due to twice calls.

Further, it is possible to narrow the call area in response to a request from the mobile body 1070. For instance, the mobile body 1070 measures the mobility thereof. When the measured mobility is less then a predetermined value, at a call end, the mobile body 1070 requests a narrower call area via the radio base station 1065. When the mobility is more than a predetermined value, the narrower call area is not requested. Therefore, the call area can be narrowed for only the mobile body which requests the narrower call area, so that the call area can be narrowed to the narrower call area including the radio zone 1061 existing when a call ends. As described above, only the call area of the mobile body of less mobility can be narrowed, and the call area of the mobile body of a large mobility is kept at a set wide call area. Therefore, it is possible to reduce the traffic of calls and at the same time to reduce a call delay.

As described above, in the mobile communication system and the control method of the first aspect of the present invention, since the communication system is controlled on the basis of the service management data of the traffic machines of predictable travel routes and the line management data of the mobile communication system under systematic considerations, it is possible to reduce the waiting time of the traffic machines and the congestion of the mobile communication lines, thus improving the serviceability of the mobile communication system.

Further, in the mobile communication system and the control method of the second aspect of the present invention, when the mobile body staying at the same position register area for many hours is not registered in the nonregistered areas, it is possible to reduce the traffic of calls and position registers, thus increasing the number of accommodated mobile communication terminal units.

[Third aspect]

In the third aspect of the mobile communication system according to the present invention, the service management of traffic machines (trains, in particular) and the line management of mobile communication terminal units are both controlled in cooperation with each other for improvement of the communication services.

(First embodiment)

Figure 29:
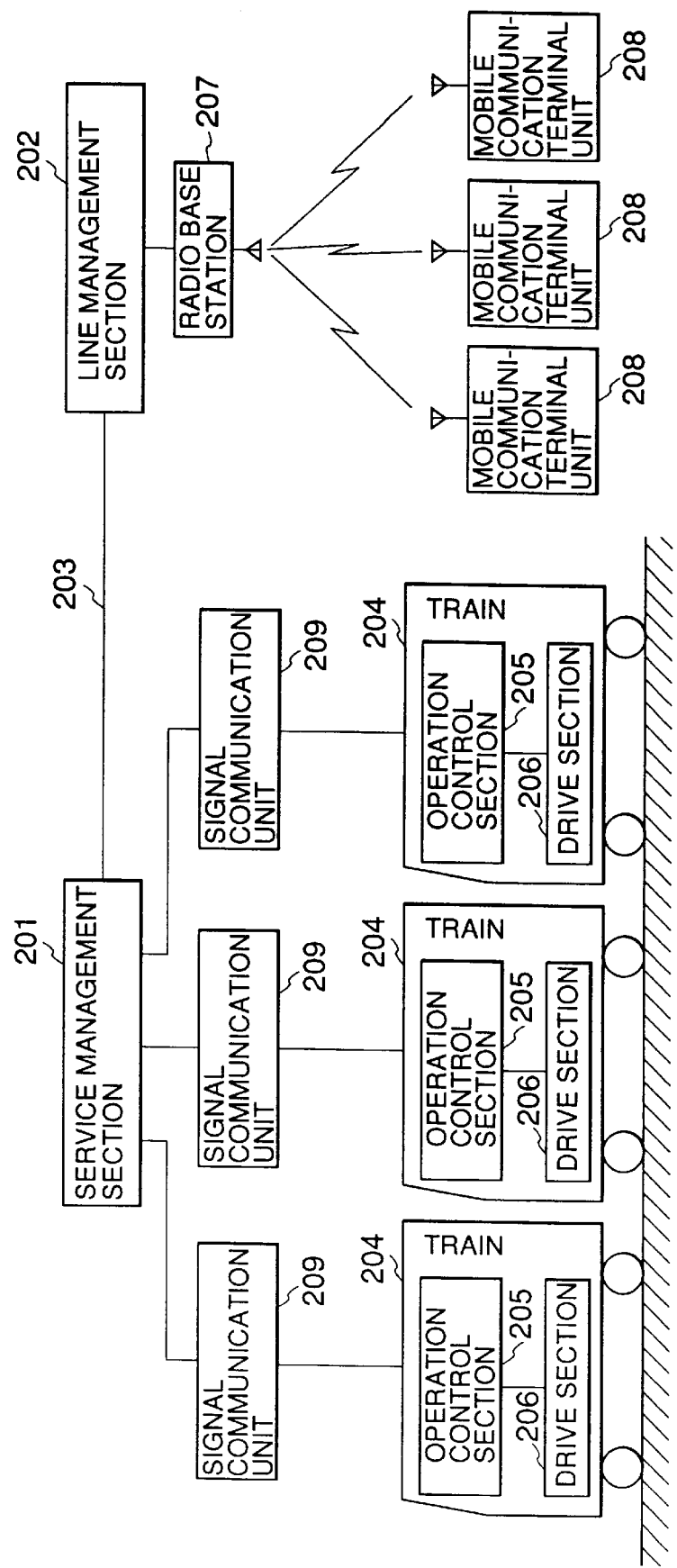
FIG. 29 is a block diagram showing the first embodiment of the third aspect of the mobile communication system according to the present invention.

A first (basic) embodiment of the third aspect of the present invention will be described hereinbelow with reference to FIG. 29. In FIG. 29, the mobile communication system comprises a service management section 201 for controlling trains 204, and a line management section 201 for controlling mobile communication terminal units 208. Further, a data transmission path 203 is interposed between the service management section 201 and the line management section 202 to transmit data between the two management sections 201 and 202. A plurality of trains 204 are connected to the service management section 201 via a plurality of signal communication units 209, respectively. A plurality of mobile communication terminal units 208 are connected to the line management section 202 via a radio base station 207 and radio lines. Further, each traffic train 204 has an operation control section 205, and a drive section 206 for moving each train 204. The radio base station 207 is provided with a modulate/demodulate function for communications between the mobile communication terminal units 208. A mobile communication terminal unit 208 can communicate with the radio base station 207 via the radio line.

In the conventional mobile communication system in the urban traffic, the mobile communication units are connected to the trains only through a ground installation (e.g., rails, signal transmission units, etc.). In the present invention, however, since the service management section 201 and the line management section 202 are connected via the data transmission path 203, it is possible to effectively interlink the mobile communications with the train operation.

The operation of the mobile communication system as described above will be described hereinbelow. When one of the train 204 starts, a control signal is outputted from the operation control section 205 to the drive section 206. The drive section 206 having a power can drive the train 204.

The service management section 201 receives the respective movement status of the train 204, and outputs an operation command to the operation control section 205 of the train 204. The base station 207 connected to the line management section 202 manages the radio lines between the base station 207 and the radio terminal units 208. Between the service management section 201 and the line management section 202, service management data of both the train and the line management data of the radio communication terminal units 208 are transmitted mutually through the data transmission path 203. Therefore, when there exists radio terminal units in or out of the train 204, it is possible to execute the mutually linked operation between the train 204 and the radio terminal units 208, as described below.

(Second embodiment)

Figure 30:
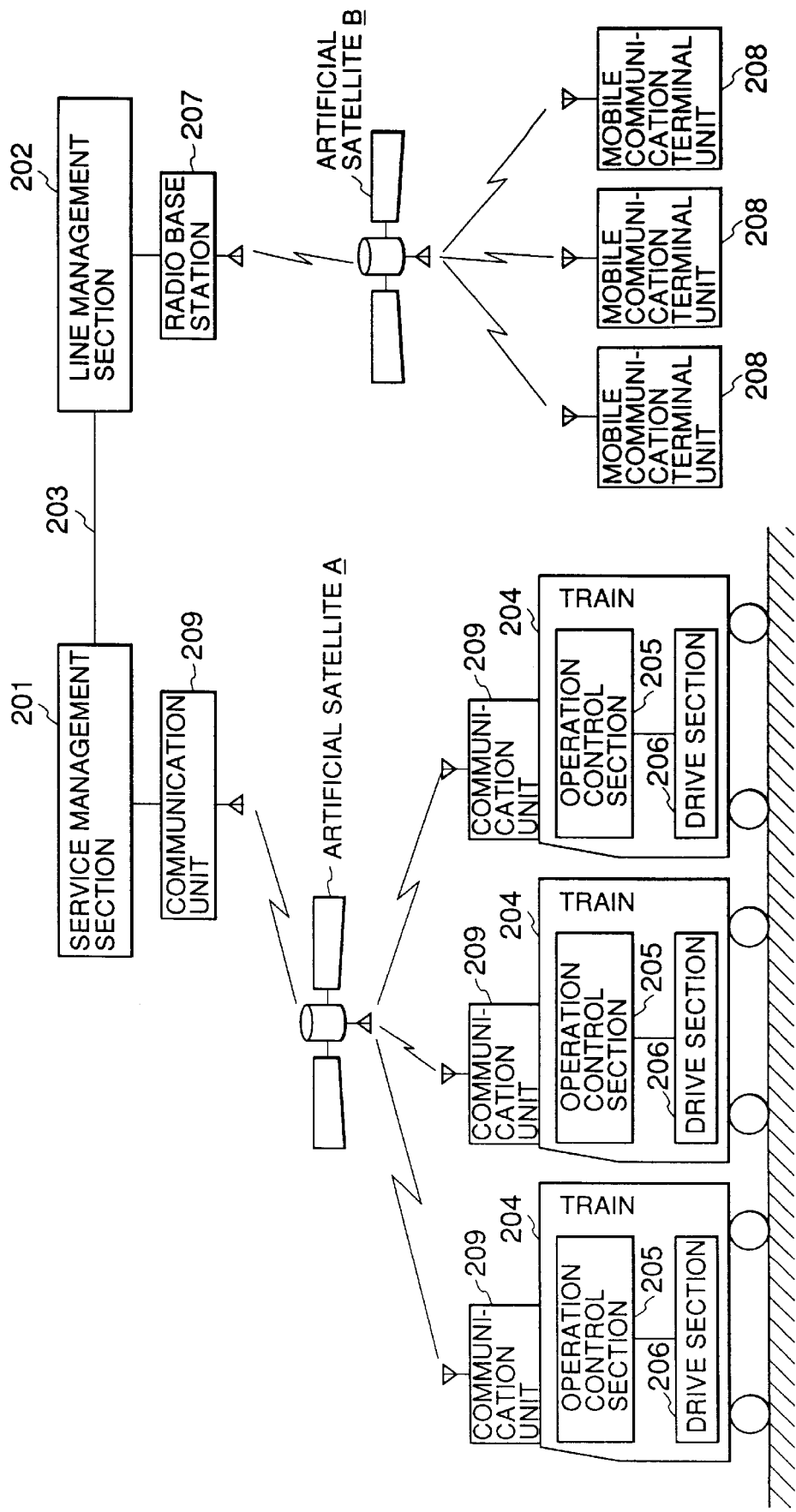
FIG. 30 is a block diagram showing the second embodiment of the third aspect of the mobile communication system according to the present invention.

A second embodiment of the third aspect of the present invention will be described hereinbelow with reference to FIG. 30. In FIG. 30, the mobile communication system comprises a service management section 201 for controlling a plurality of trains 204, a line management section 202 for controlling a plurality of mobile communication terminal units 208, a data transmission path 203 for transmitting data between the two management sections 201 and 202. The trains 204 have each an operation control section 205 and a drive section 206 having a power for driving the train 204. In addition, the system comprises an artificial satellite A connected between the trains 204 and the service management section 201 provided with an appropriate communication unit, respectively. In the same way, the system comprises an artificial satellite B connected between the mobile transmission units 208 and the line management section 204 provided with an appropriate communication unit, respectively.

In the domestic railways, the artificial satellites may be eliminated. In the case of transcontinental railways, however, train data can be transmitted to the service management section 201 and the mobile communication data can be transmitted to the line control section 202 both via the artificial satellite, respectively. Here, it should be noted that the two artificial satellites A and B are used separately for both the trains and the mobile communication terminal units. The operation of this second embodiment is basically the same as with the case of the first embodiment, except the use of the artificial satellites A and B.

(Third embodiment)

Figure 31:
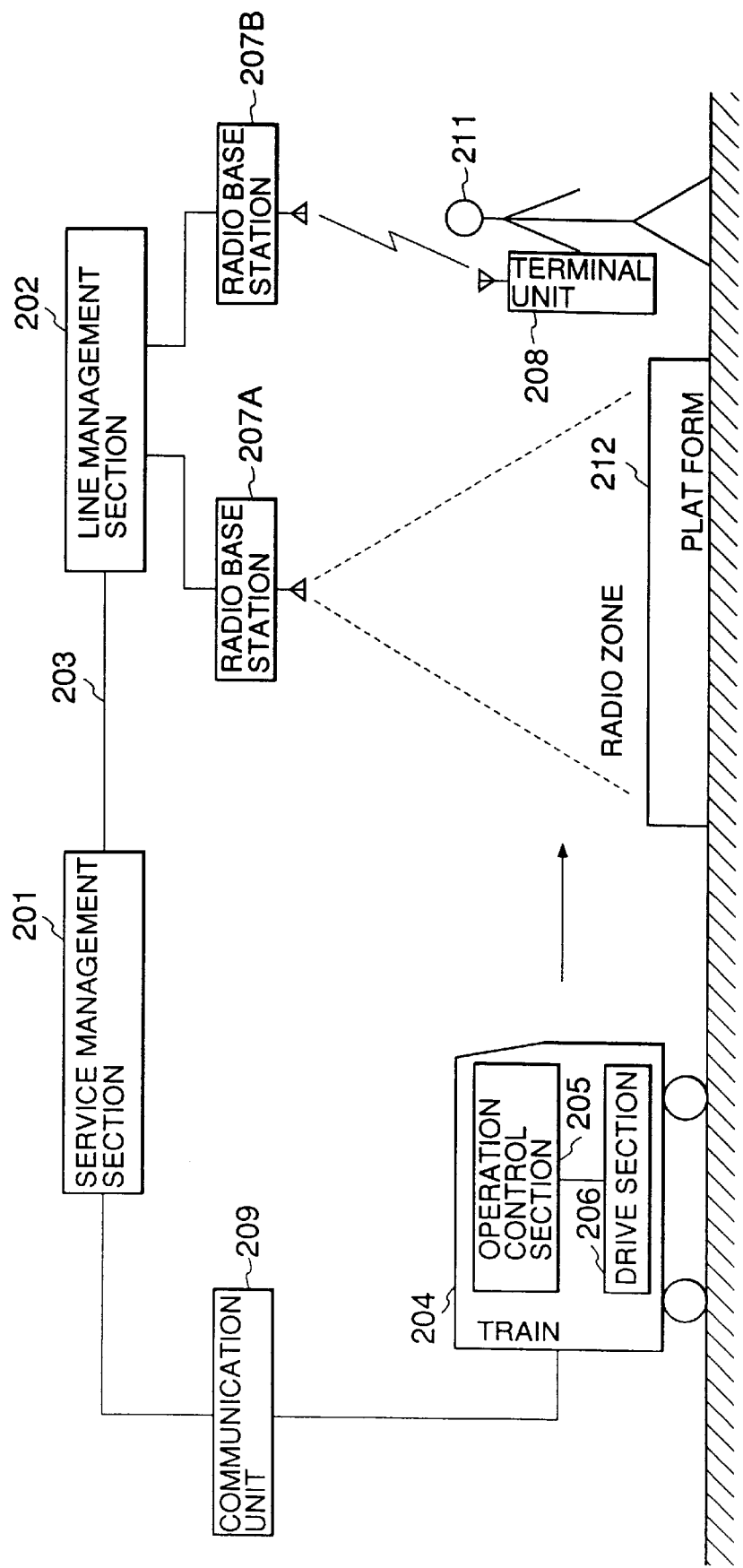
FIG. 31 is a block diagram showing the third embodiment of the third aspect of the mobile communication system according to the present invention.

A third embodiment of the third aspect of the present invention will be explained with reference to FIG. 31. In FIG. 31, a service management section 201 and a line management section 202 of the mobile communications are connected by a data transmission path 203. The line management section 202 is connected to two radio base stations 207A and 207B for monitoring a mobile communication user having a mobile communication unit 208.

In operation, when the user having the mobile communication unit 208 approaches a platform 212 of a station, the radio zone of the base station 207A is handed off to the ratio zone of the base station 207B, so that the hand-off data is transmitted to the train 204 via the line management section 202 to the service management section 201, so that the train 4 can be stopped at the platform 212 of the station.

(Fourth embodiment)

Figure 32:
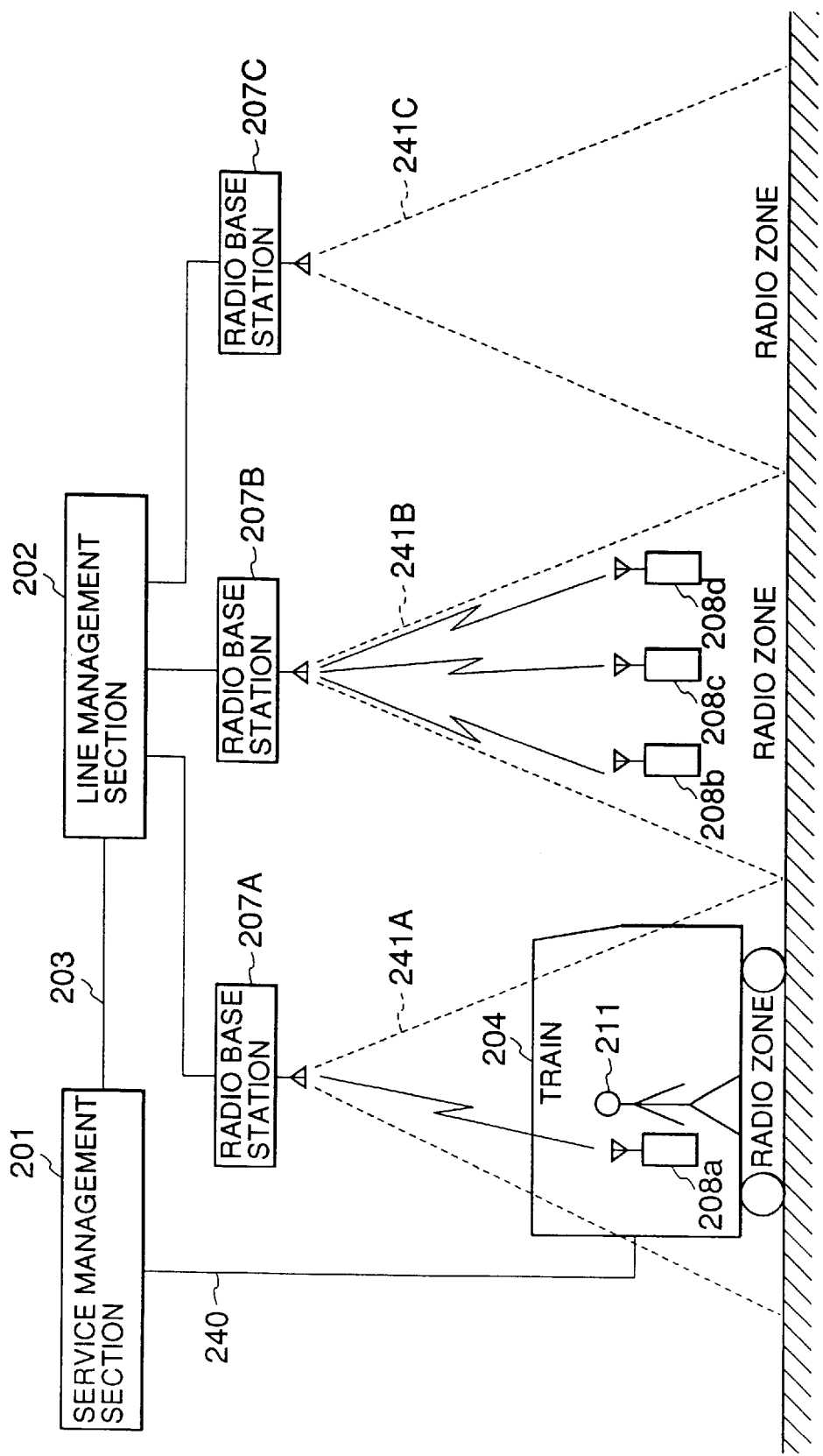
FIG. 32 is a block diagram showing the fourth embodiment of the third aspect of the mobile communication system according to the present invention.

The fourth embodiment of the third aspect of the present invention will be described hereinafter with reference to FIG. 32.

A service management section 201 of the train 204 and a line management section 202 for the mobile communications are connected by a data transmission path 203. When the train 204 approaches the radio zone 241B in which communications are congested by a plurality of mobile communication units 208b 208d, the service management section 201 for managing the service of the train 204 transmits the passing data of the train 204 to the line management section 202. Then, the line management section 202 informs the radio zone 241A of the base station 207A of the train 204 that the radio zone 241B of the base station 207B is congested. Therefore, since the new call is suppressed for other the mobile terminal units 208 in the radio zone 241A of the base station 207A (for the train 204), it is possible to prevent the mobile communication unit 208a from being interrupted forcibly when the train enters the radio zone 241B of the radio base station 207B.

(Fifth embodiment)

Figure 33:
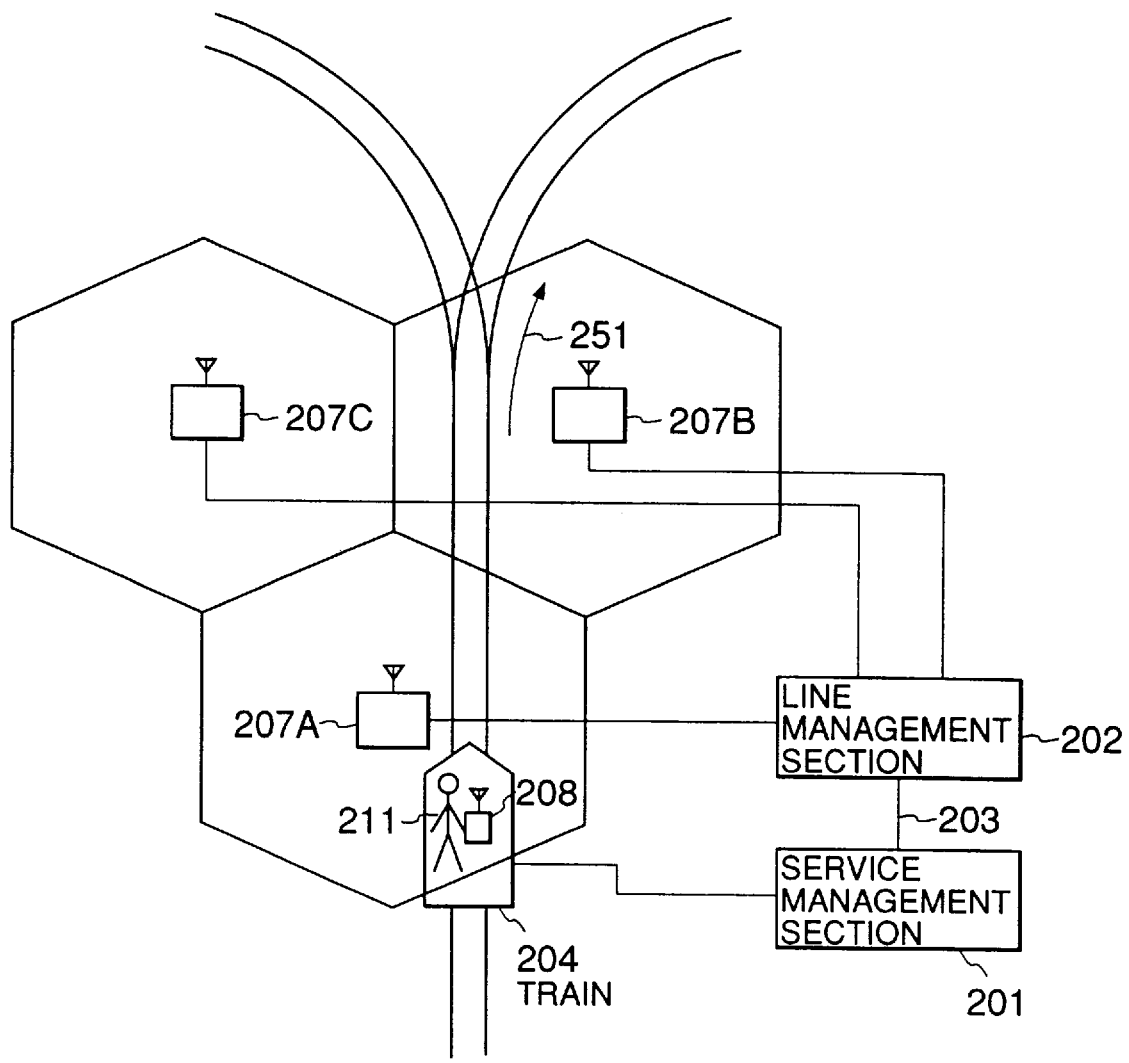
FIG. 33 is a block diagram showing the fifth embodiment of the third aspect of the mobile communication system according to the present invention.

In FIG. 33, when the train 204 will travel along a route 251, the service management section 201 informs the travel route of the train 204 to the line management section 202, so that the line management section 202 can take an appropriate line control action (an increase of the number of lines, the suppression of other incoming calls, etc.) to the radio base station 207B located along the travel route 251 of the train 204.

(Sixth embodiment)

Figure 34:
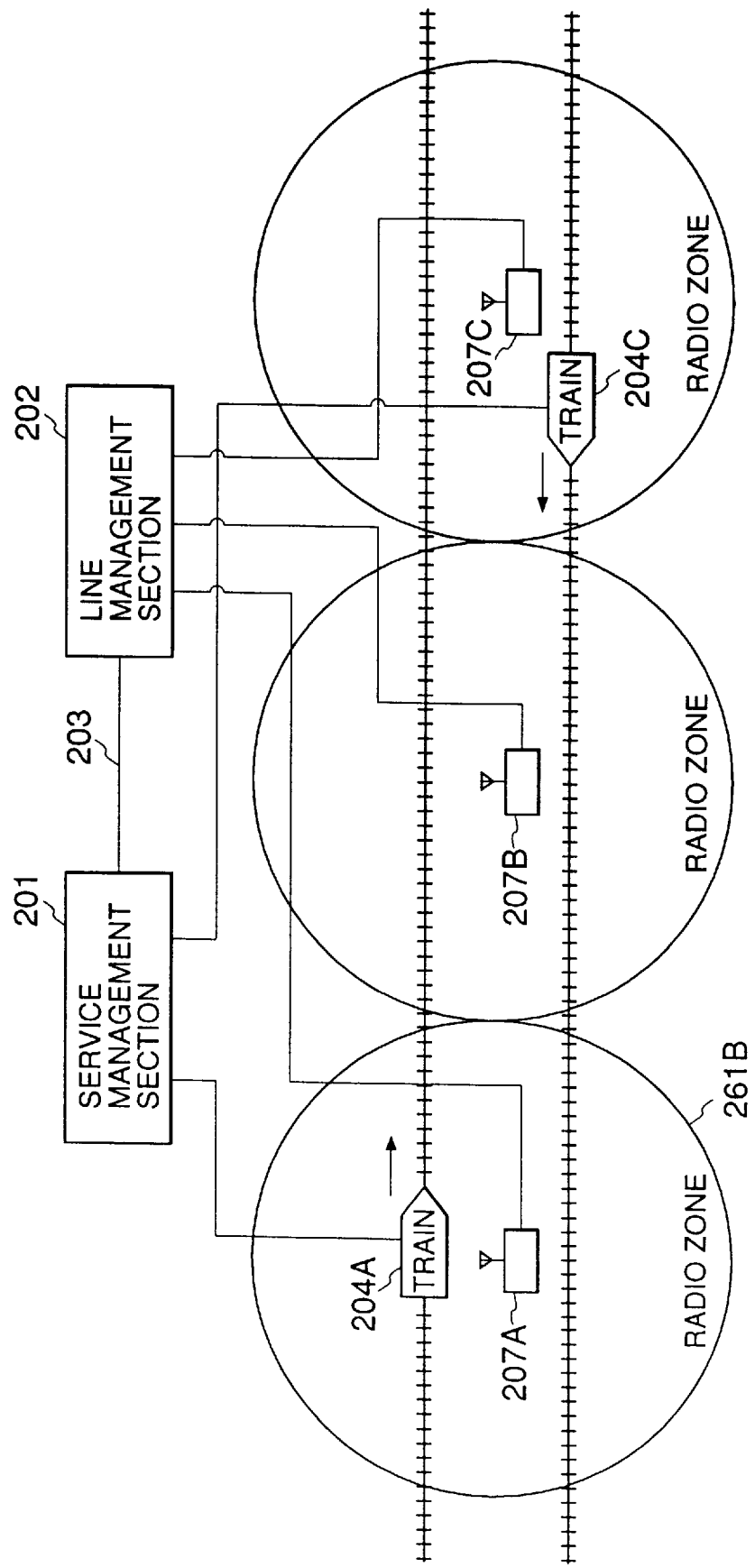
FIG. 34 is a block diagram showing the sixth embodiment of the third aspect of the mobile communication system according to the present invention.

In FIG. 34, when the trains 204A and 204C will pass each other in two opposite directions in the radio zone of the radio base station 207B, it is possible to prevent the radio base station 207B from being congested by suppressing new incoming calls or new outgoing calls to or from the mobile communication units in the trains 204A and 204B or by increasing the number of radio lines to be allocated. Instead, when the congestion in the frontward radio zone is predicted, it is also possible to inform the users having the mobile communication unit, respectively in the train of the prediction of communications interruption.

(Seventh embodiment)

Figure 35:
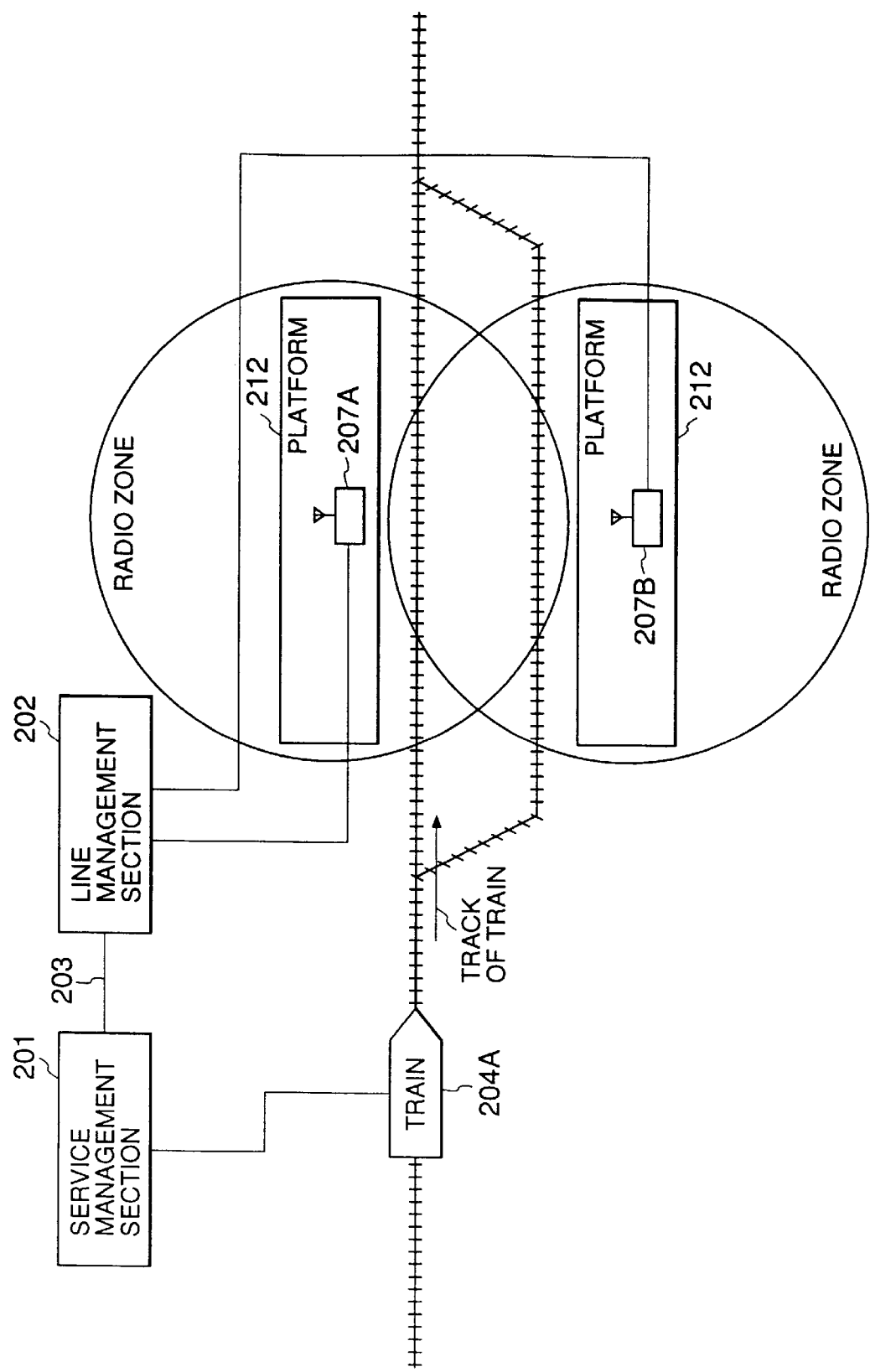
FIG. 35 is a block diagram showing the seventh embodiment of the third aspect of the mobile communication system according to the present invention.

In FIG. 35, when the train 204A approaches a stop station (platform) 212, the service management section 201 informs the line management section 202 of the route of the train 204A. Then, the radio base station 207A is controlled in such a way that calls can be suppressed or the number of channels can be increased. On the other hand, the base station 207B is not controlled so that communications are not interrupted forcibly and the usability of the mobile communication terminal units can be increased.

(Eighth embodiment)

Figure 36:
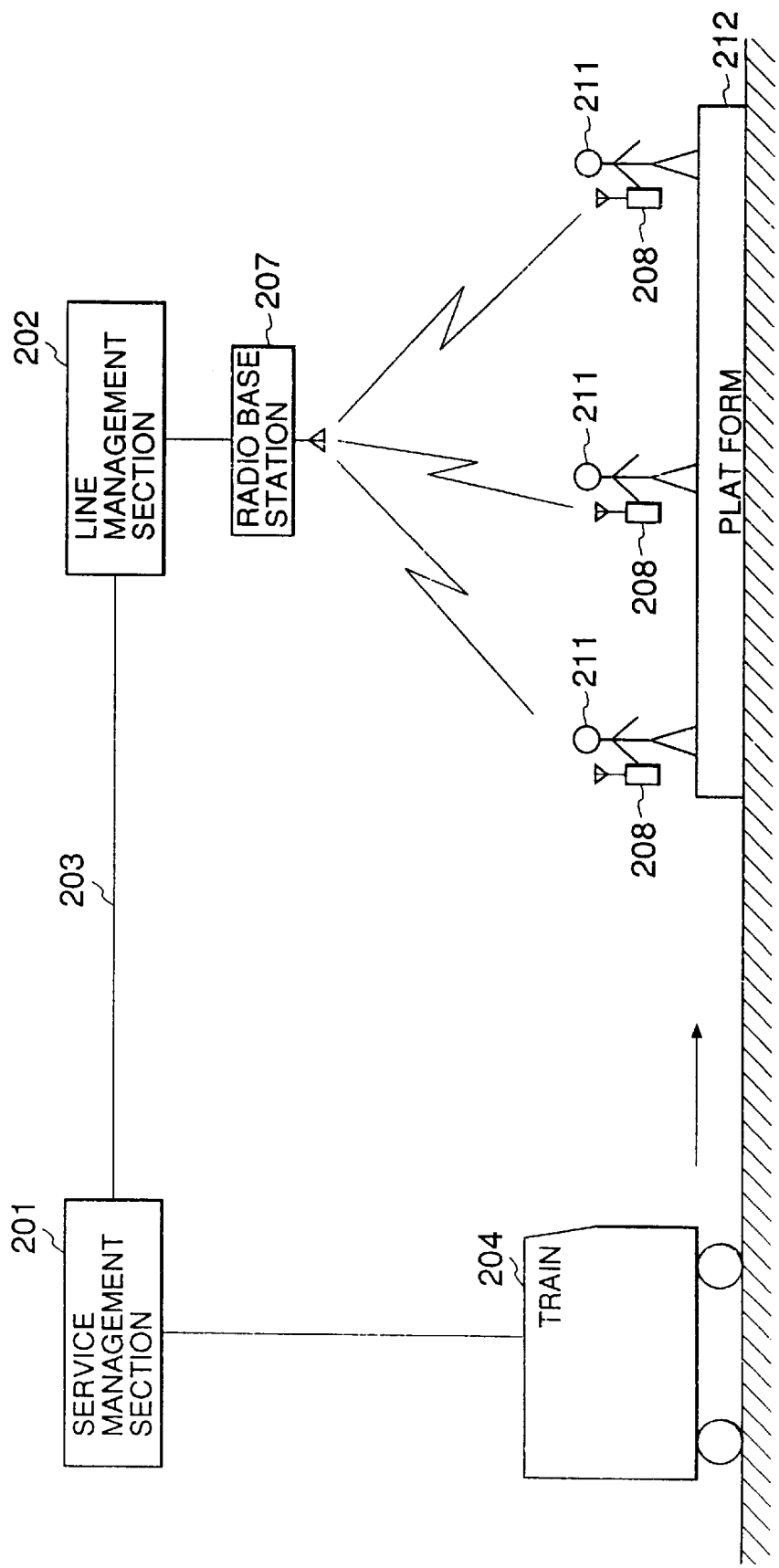
FIG. 36 is a block diagram showing the eighth embodiment of the third aspect of the mobile communication system according to the present invention.

In FIG. 36, the number of users having the mobile communication terminal units 208 on a platform 212 is checked by the radio base station 207, On the basis of the number of the users, the total number of the passengers waiting on the platform is estimated by the service management section 201 or the line management section 202, and the train for many waiting passengers on the platform is allowed to enter the platform with priority for safety or for prevention of delay of the train departure.

(Ninth embodiment)

Figure 37:
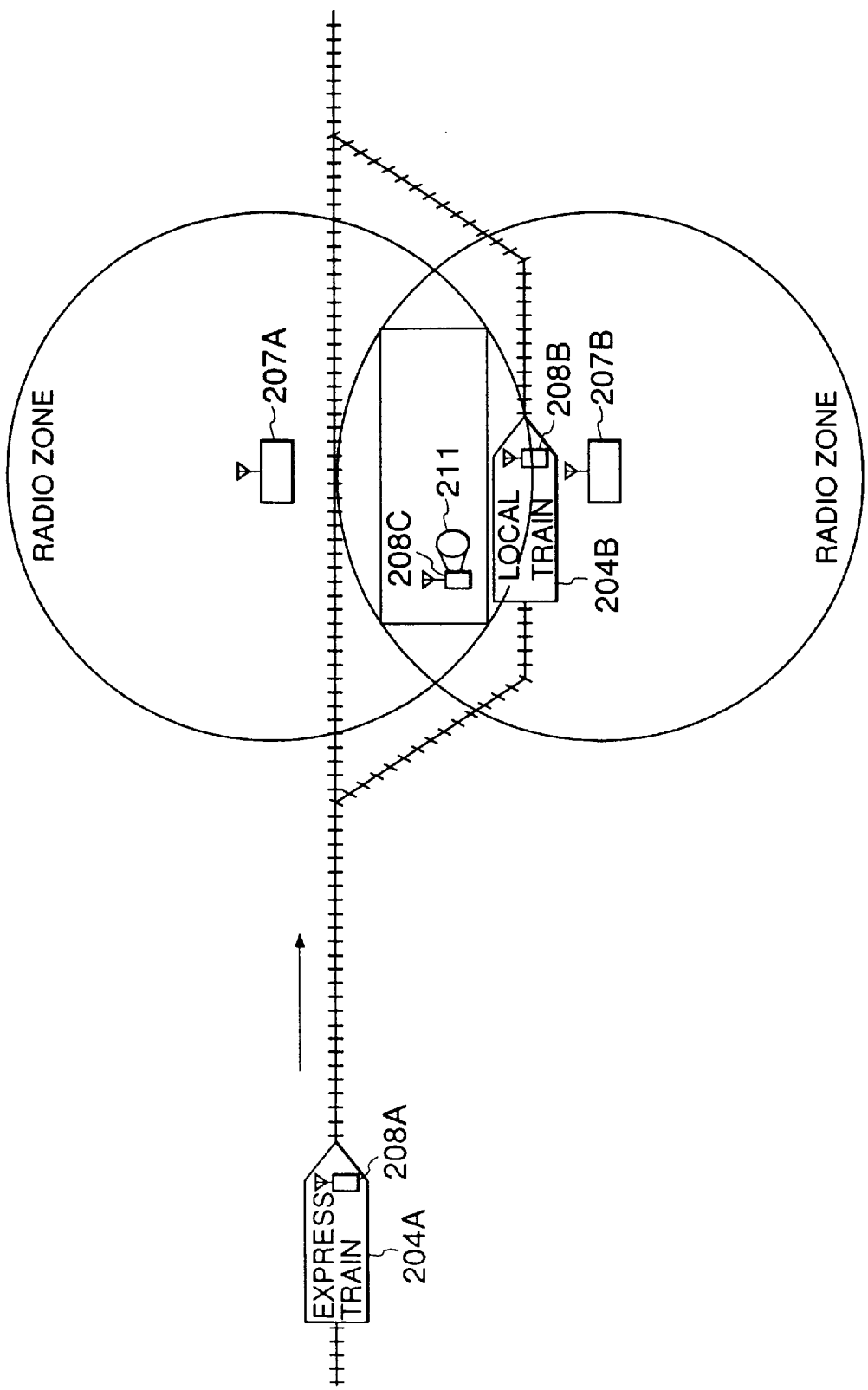
FIG. 37 is a block diagram showing the ninth embodiment of the third aspect of the mobile communication system according to the present invention.

In FIG. 37, the two radio base stations 207A and 207B are installed so as to be connectable to both the mobile communication terminal unit 7A on the platform and the mobile communication terminal unit 7B in the ordinary trains. Further, when an express train 204A passes the ordinary (local) train 204B at the station, the mobile communication terminal unit 208C on the platform and the mobile communication terminal unit 208B in the ordinary (local) train 2048 are connected to the radio base station 207B with priority, to prevent the forced communication interruption due to the passing of the express trains or the stopping of the ordinary train.

[Fourth aspect]

A fourth aspect of the mobile communication system according to the present invention will be explained hereinbelow. This mobile communication system is composed of at least one position register area and at least one position non-register area. The position of a mobile body existing in the position register area is registered, and the position of a mobile body existing in the position nonregister area is not registered.

(First embodiment)

Figure 38:
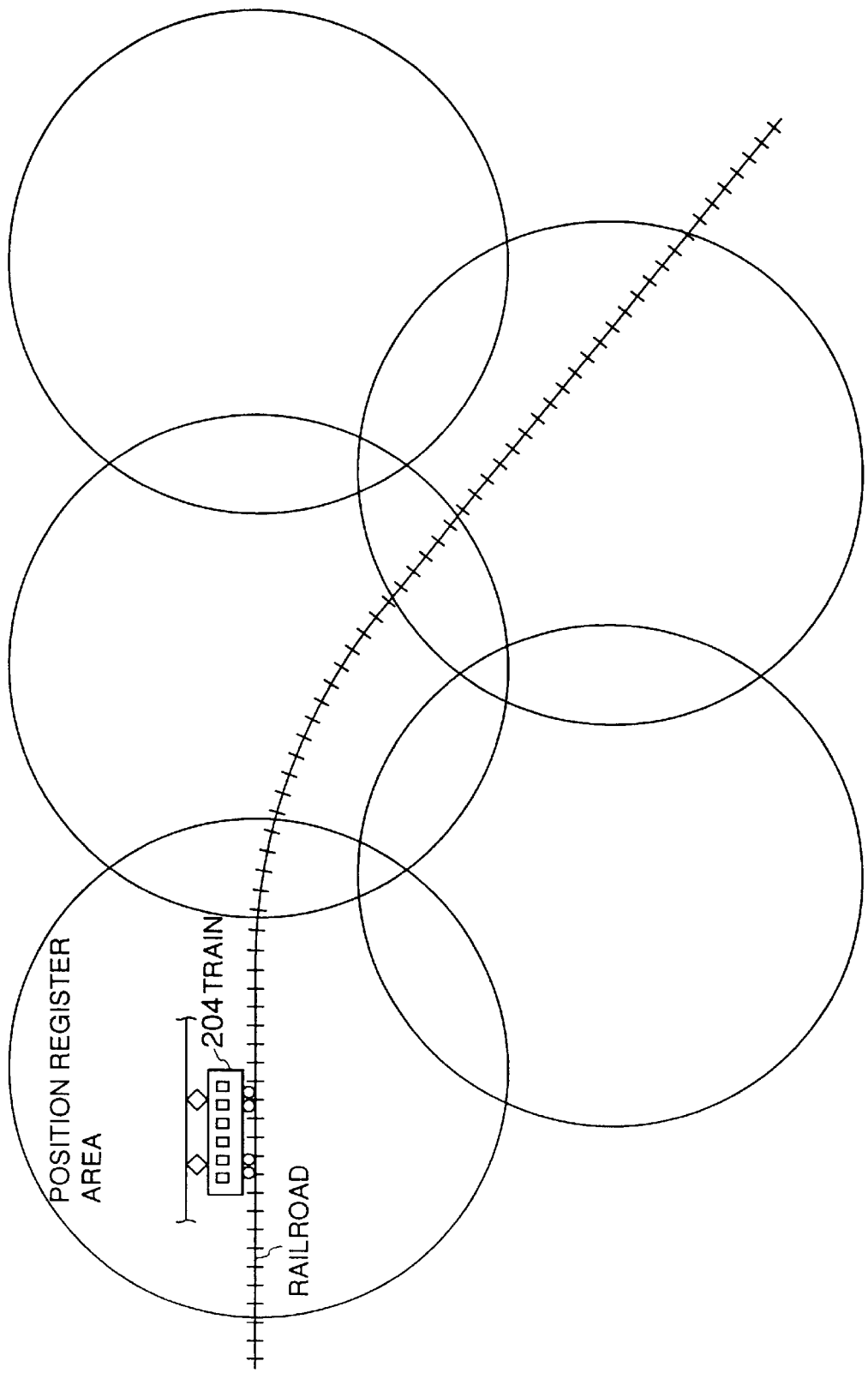
FIG. 38 is a block diagram showing the first embodiment of the fourth aspect of the mobile communication system according to the present invention.

As shown in FIG. 38, the positions of the users in the train are not registered, and the users of the train call or are called on the basis of the service schedule of the trains. Since the positions of a large number of the users moving at high speed are not registered, it is possible to decrease the traffic of calls. Further, when the users reach the destination station, the train releases the corresponding position registers of the users. However, when the users get off the train at the station, the traffic of position registers of the users will not increase at the same time.

In addition, when the position register areas of the users are changed according to the kinds (ordinary, express, supper express, etc.) of the trains, it is possible to reduce the traffic of the position registers of the users moving by the train at high speed.

(Second embodiment)

Figure 39:
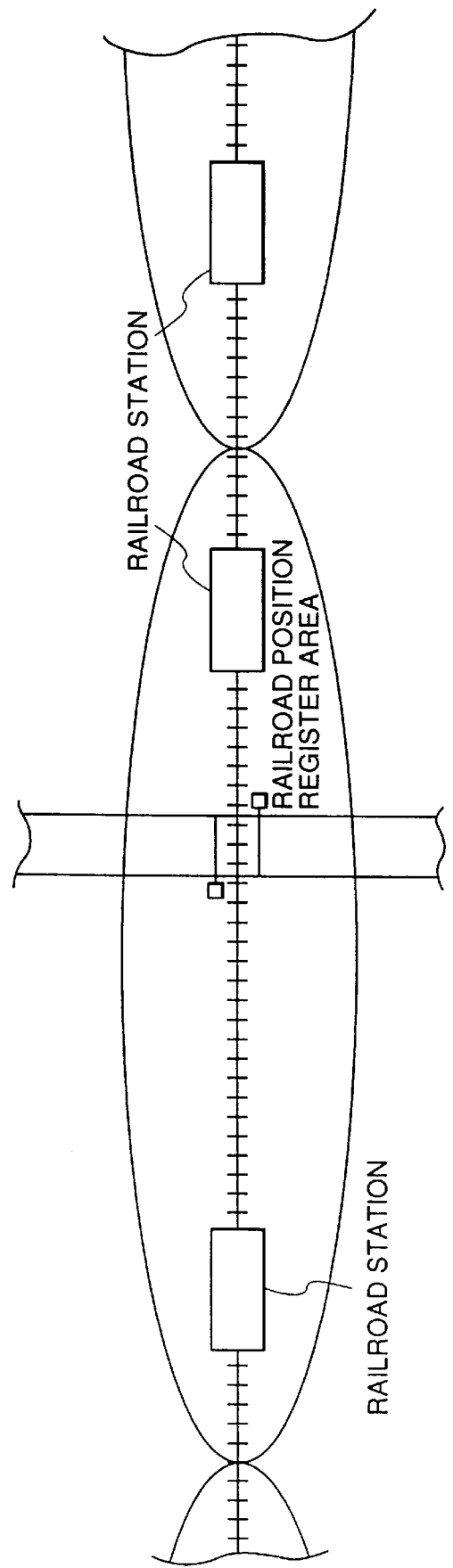
FIG. 39 is a block diagram showing the second embodiment of the third aspect of the mobile communication system according to the present invention.

In FIG. 39, only when the users pass through ticket examination gate at the station, the position register areas of the user are changed to those provided for only railways. In this case, it is also possible to separate the position registers of users goes across a railroad crossing from the users in the trains.

As described above, in the mobile communication system and the control method of the third aspect of the present invention, since the communication system is controlled on the basis of the service management data of the trains of predictable travel routes and the line management data of the mobile communication system under systematic considerations, it is possible to reduce the congestion of radio zone and traffics of calls and position registers effectively, thus improving the serviceability of the mobile communication system.

Further, in the mobile communication system and the control method of the fourth aspect of the present invention, since it is possible to register the user positions separately between the users in trains and other users, it is possible to reduce the traffic of calls and position registers, thus increasing the number of accommodated mobile communication terminal units.

What is claimed is:

1. A mobile communication system including operation management of traffic machines, comprising:

mobile radio terminal means for receiving predetermined communication data, and which can be carried by a user of mobile communication;

at least one traffic machine for transporting said user having said terminal means;

operation management means for managing operation of said traffic machine by operation management data which are generated from predetermined operation data;

line management means for managing radio lines used by said terminal means on the basis of any one of position data and position change data of said terminal means;

data transmission means interposed between said operation management means and line management means and for transmitting at least said operation management data generated in said operation management means to said line management means;

radio base station means interposed between said line management means and said mobile radio terminal means and for transmitting radio signals of said communication data to said terminal means in a radio zone having a predetermined area; and wherein when it is predicted that said mobile communication user uses a traffic machine within a short time, prediction data of use of the traffic machine is transmitted from said base station means to said operation management means through said line management means.

2. A mobile communication system including operation management of traffic machines, comprising:

mobile radio terminal means for receiving predetermined communication data, and which can be carried by a user of mobile communication;

at least one traffic machine for transporting said user having said terminal means and being able to change operation management data on the basis of a requirement from said user;

operation management means for managing operation of said traffic machine by operation management data which are generated from predetermined operation data, and for managing said operation of the traffic machine on the basis of said operation management data after a change;

line management means for managing radio lines used by said terminal means on the basis any one of position data and position change data of said terminal means;

a plurality of radio base station means interposed between said line management means and said mobile radio terminal means and for transmitting radio signals of said communication data to said terminal means; and a plurality of radio zones respectively corresponding to said radio base station means, and respectively having a regional extent of a predetermined area in which said terminal means can receive said communication data from corresponding radio base terminal means:

wherein said traffic machine is an elevator installed in a hoistway penetrating through a plurality of floors in a building; and said radio zones are respectively formed by said radio base station means installed in said hoistway of said elevator and at ceilings of particular floors; and respectively being as a regional extent having a predetermined area of which said terminal means can receive said communication data from corresponding radio base terminal means:

wherein said traffic machine is an elevator installed in a hoistway penetrating through a plurality of floors in a building; and said radio zones are respectively formed by said radio base station means installed in said hoistway of said elevator and at ceilings of particular floors; and wherein when a user of said elevator directs a desired stop floor by said operation data, said operation management means generates said operation management data on the basis of said operation data to control the elevator to stop a direct stop floor and to output said operation management data to said line management means, and said line management means manages lines with respect to said direct stop floor on the basis of said operation management means manages lines with respect to said direct stop floor on the basis of said operation management data supplied from said operation management means.

3. A mobile communication system including operation management of traffic machines, comprising:

mobile radio terminal means for receiving predetermined communication data, and which can be carried by a user of mobile communication;

at least one traffic machine for transporting said user having said terminal means and being able to change operation management data on the basis of a requirement from said user;

operation management means for managing operation of said traffic machine by operation management data which are generated from predetermined operation data, and for managing said operation of the traffic machine on the basis of said operation management data after a change;

line management means for managing radio lines used by said terminal means on the basis any one of position data and position change data of said terminal means;

a plurality of radio base station means interposed between said line management means and said mobile radio terminal means and for transmitting radio signals of said communication data to said terminal means; and a plurality of radio zones respectively corresponding to each of said radio base station means, and respectively having a regional extent of a predetermined area in which said terminal means can receive said communication data from corresponding radio base terminal means:

wherein said traffic machine is an elevator installed in a hoistway penetrating through a plurality of floors in a building; and said radio zones are respectively formed by said radio base station means installed in said hoistway of said elevator and at ceilings of particular floors: and wherein said operation management means manages operation of said elevator in relation to the prediction of a use of a communication line by said line management means.

4. A mobile communication system including operation management of traffic machines, comprising:

mobile radio terminal means for receiving predetermined communication data; and which can be carried by a user of mobile communication;

at least one traffic machine for transporting said user having said terminal means;

operating management means for managing operation of said traffic machine by operation management data which are generated from predetermined operation data;

line management means for managing radio lines used by said terminal means on the basis of any one of position data and position change data of said terminal means; and data transmission means for transmitting said operation management data generated in said operation management means to said line management means:

wherein movement of said mobile communication user existing in said traffic machine is predicted on the basis of movement status of said traffic machine, to control said mobile communication at a user's destination before said user reaches the destination.

* * * * *